United States Patent [19]
Clark

[11] 3,836,719
[45] Sept. 17, 1974

[54] TASI ASSIGNMENT CONTROL ARRANGEMENT

[75] Inventor: James M. Clark, Cedar Grove, N.J.

[73] Assignee: International Telephone and Telegraph Corporation, Nutley, N.J.

[22] Filed: July 2, 1973

[21] Appl. No.: 376,095

[52] U.S. Cl. .......... 179/15 AS
[51] Int. Cl. .......... H04j 5/00
[58] Field of Search .......... 179/15 AS

[56] References Cited

UNITED STATES PATENTS

| | | | |
|---|---|---|---|
| 3,660,605 | 5/1972 | Rees | 179/15 AS |
| 3,721,767 | 3/1973 | La March | 179/15 AS |
| 3,790,715 | 2/1974 | Inose | 179/15 AS |

*Primary Examiner*—Ralph D. Blakeslee
*Attorney, Agent, or Firm*—John T. O'Halloran; Menotti J. Lombardi, Jr.; Alfred C. Hill

[57] ABSTRACT

A TASI communication system includes P input PCM speech channels to a transmitter and P output PCM speech channels from a receiver and T PCM channels for T of the P channels to be propagated between the transmitter and the receiver, where P is an integer greater than one and T is an integer greater than one but less than P. P PCM speech words corresponding to the P input and output channels are arranged to form a first TDM frame format and T speech words corresponding to the T channels and one-half of a control word are organized to form a second TDM frame format with $2(T + 1)$ frames of the second format being organized to form a multiframe. The first $[2(T + 1) -2]$ frames of the second frame format in the multiframe includes a different one of transmitted assignment code words for each of the first T of the control words. An assignment control arrangement is provided at both the transmitter and the receiver. The transmitter assignment control arrangement includes a storage means to store in sequence code words identifying the previous assignment for each of the P channels. Logic circuitry is provided responsive to a first transmit timing signal identifying each of the P speech words in sequence in the first format, a second transmit timing signal identifying each of the T speech words in sequence in the second format, a third transmit timing signal identifying each of the T control words in sequence during each search cycle, a fourth transmit timing signal identifying each of the T control words in sequence during each update cycle at the transmitter and the code words at the output of the storage means to determine the connection and activity status of each of the P channels and to produce code words identifying the assignment of previously connected ones or active ones of the P channels to particular ones of the T channels that are still connected and active and to identify new assignments to enable newly active ones of the P channels to be connected to available ones of the T channels and second logic circuitry responsive to at least the code words at the output of the storage means, the first and fourth transmit timing signals to return the code words to the storage means identifying previously established assignments (previous connections) that are to remain as before and to update the code words stored in the storage means for any new assignments. The receiver assignment control arrangement also includes a storage means to store in sequence code words identifying the previous assignment for each of the P channels as received from the transmitter and third logic circuitry responsive to transmitted code words, a first receive timing signal identifying each of the P speech words in sequence in the first format, a second receive timing signal identifying each of the T speech words in sequence in the second format, a third timing signal identifying each of the T control words in sequence during each update cycle at the receiver and the code words at the output of the receiver storage means to return the code words to the receiver storage means identifying previously established connections that are to remain and to update the code words stored in the receiver storage means for the new assignments.

23 Claims, 26 Drawing Figures

TASI ASSIGNMENT CONTROL ARRANGEMENT

BACKGROUND OF THE INVENTION

This invention relates to time assignment speech interpolation (TASI) communication systems and more particularly to an assignment control arrangement at both the transmitter and receiver of the TASI system.

SUMMARY OF THE INVENTION

An object of the present invention is to provide an improved assignment control arrangement at both the transmitter and receiver of a TASI communication system.

A feature of the present invention is the provision in a TASI communication system having P input pulse code modulated (PCM) speech channels to a transmitter of the system and P output PCM speech channels from a receiver of the system and T PCM channels for T of the P channels to be propagated between the transmitter and the receiver, where P is an integer greater than one and T is an integer greater than one but less than P, the P input and output channels being organized to form a first time division multiplex (TDM) frame format, the T channels and a portion of a control word being organized to form a second TDM frame format and 2(T + 1) of the second format being organized to form a multiframe, a first assignment control arrangement for the transmitter comprising: first means to produce timing signals including at least a first transmit timing signal identifying the number of the P channels in sequence in the first format, a second transmit timing signal identifying the number of the T channels in sequence in the second format, a third transmit timing signal identifying the number of the T channels in sequence during each search cycle and a fourth transmit timing signal identifying the number of the T channels in sequence during each update cycle at the transmitter; second means to store in sequence code words identifying the previous assignment of each of the P channels; third means coupled to the first and second means responsive to the first, second, third and fourth transmit timing signals and the code words at the output of the second means to determine the connection and activity status of each of the P channels and to produce code words identifying the assignment of previously connected ones of active ones of the P channels to particular ones of the T channels that are still connected and active and to identify new assignments to enable newly active ones of the P channels to be connected to available ones of the T channels; fourth means coupled to the third means, the first means and the second means responsive to at least the code words at the output of the second means, the first and fourth transmit timing signals to return the code words to the second means identifying the assignment of previous connections that are still active and connected and to update the code words stored in the second means for the new assignments; and fifth means coupled to the third means to transmit the code words in the appropriate portion of the multiframe to the receiver; and a second assignment control arrangement for the receiver comprising: sixth means to produce timing signals including a first receive timing signal identifying the number of the P channels in sequence in the first format, a second receive timing signal identifying the number of the T channels in sequence in the second format, and a third receive timing signal identifying the number of the T channels in sequence during each update cycle at the receiver; seventh means to store in sequence code words identifying the previous assignment of each of the P channels; and eighth means coupled to the fifth means, the sixth means and the seventh means responsive to the transmitted code words, the first, second and third receive timing signals and the code words at the output of the seventh means to return the code words to the seventh means identifying the assignment of previous connections that are still active and connected and to update the code words stored in the seventh means for the new assignments.

Another feature of the present invention is the provision in a TASI communication system having P input PCM speech channels to a transmitter of the system and T PCM channels for T of the P channels propagated from the transmitter, where P is an integer greater than one and T is an integer greater than one but less than P, the P input channels being organized to form a first TDM frame format, the T channels and a portion of a control word being organized to form a second TDM frame format and 2 (T + 1) of the second format being organized to form a multiframe, an assignment control arrangement for the transmitter comprising: first means to produce timing signals including at least a first timing signal identifying the number of the P channels in sequence in the first format, a second timing signal identifying the number of the T channels in sequence in the second format, a third timing signal identifying the number of the T channels in sequence during each search cycle and a fourth timing signal identifying the number of the T channels in sequence during each update cycle at the transmitter; second means to store in sequence code words identifying the previous assignment of each of the P channels; third means coupled to the first and second means responsive to the first, second, third and fourth timing signals and the code words at the output of the second means to determine the connection and activity status of each of the P channels and to produce code words identifying the assignment of previously connected ones of active ones of the P channels to particular ones of the T channels that are still connected and active and to identify new assignments to enable newly active ones of the P channels to be connected to available ones of the T channels; and fourth means coupled to the third means, the first means and the second means responsive to at least the code words at the output of the second means, the first and fourth timing signal to return the code words to the second means identifying the assignment of previous connections that are still active and connected and to update the code words stored in the second means for the new assignments.

Still another feature of the present invention is the provision in a TASI communication system having P output pulse code modulated speech channels from a receiver of the system and T pulse code modulated channels for T of the P channels propagated to the receiver, where P is an integer greater than one and T is an integer greater than one but less than P, the P output channels being organized to form a first TDM frame format, the T channels and one-half of a control word being organized to form a second TDM frame format, 2(T + 1) of the second format being organized to form a multiframe, and the first [2(T + 1)–2] of the second format in the multiframe including a different code word for each of the first T of the control words, an assignment control arrangement for the receiver comprising: first means to produce timing signals including a first timing signal identifying the number of the P channels in sequence in the first format, a second timing signal identifying the number of the T channels in sequence in the second format, and a third timing signal identifying the number of the T channels in sequence during each update cycle at the receiver; second means to store in sequence code words identifying the previous assignment of each of the T channels; and third means coupled to the first means and the second means responsive to the received assignment code words, the first, second and third timing signals and the code words at the output of the second means to return the code words to the second means identifying the assignment of previous connections that are still active and connected and to update the code words stored in the second means for the new assignments.

BRIEF DESCRIPTION OF THE DRAWING

Above-mentioned and other features and objects of this invention will become more apparent by reference to the following description taken in conjunction with the accompanying drawing, in which:

FIGS. 21A, 21B and 21C, when organized as illustrated in FIG. 21D, illustrates the logic diagram of the TASI transmit equipment assignment control arrangement of FIG. 20 in accordance with the principles of the present invention.

DESCRIPTION OF THE PREFERRED EMBODIMENT

Figure 1:
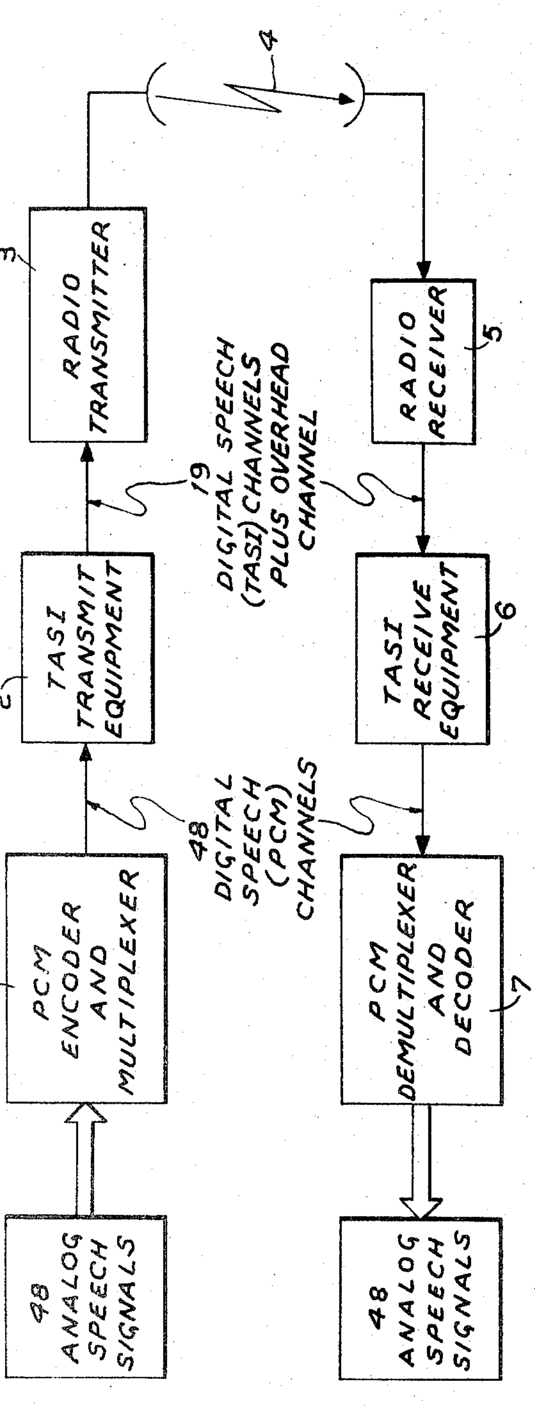
FIG. 1 is a block diagram of the basic components contained in a TASI communication system.

Referring to FIG. 1 there is illustrated therein a block diagram of the basic components of a TASI communication system. The equipment of this system automatically connects 19 of 48 incoming speech channels to outgoing channels depending on the activity of the channels with the inactive channels being disconnected. The 19 outgoing channels and an overhead channel are transmitted, and the receiving part of the TASI communication system connects the 19 received channels to 19 of 48 channels corresponding to the incoming channels. An idle noise signal is provided as an output in the remaining 29 channels corresponding to disconnected incoming signals. This system reduces the cost of transmission by reducing the number of transmission channels, taking advantage of the fact that most of the source channels are inactive at any given moment of time. As illustrated in FIG. 1 the TASI system includes a PCM encoder and multiplexer 1 which receives 48 channels of analog speech signals and encodes these channel signals into digital (PCM) speech signals and time multiplexes these speech channels into 48 digital speech channels to form a TDM frame. The output of encoder and multiplexer 1 is then coupled to the TASI transmit equipment 2 where 19 of the 48 incoming digital channels are connected to 19 outgoing channels which are coupled to a radio transmitter 3 for transmission through a radio propagation medium 4 to a radio receiver 5. The 19 digital (PCM) speech channels at the output of radio receiver 5 are connected to the TASI receive equipment 6 wherein the 19 received digital channels are connected to 19 of the 48 digital speech channels at the output thereof which are then coupled to the PCM demultiplexer and decoder 7 to recover the analog speech channels for coupling to their appropriate utilization devices. As indicated hereinabove, equipment 6 provides idle noise signals in the 29 channels which correspond to the disconnected incoming signals to encoder and multiplexer 1.

As mentioned hereinabove the TASI channels are transmitted for purposes of explanation through a radio propagation medium 4 by means of radio transmitter 3 and radio receiver 5. This equipment could just as easily be replaced by appropriate equipment to enable operation in a wire communication system, such as a telephone system.

It is important to understand that the data inputs and outputs of the TASI transmit and receive equipments 2 and 6 are TDM PCM coded speech signals. That is, all of the channels appear on the signal wire. There is one signal each for the transmit equipment input, transmit equipment output, receive equipment input and receiver equipment output. A repeating period (called a frame) of such a signal is divided into time slots (smaller periods of time), one time slot for each channel. In each time slot for a speech channel, an n-bit PCM code, for instance, a 6-bit PCM code, representing a speech sample, is sent. In each time slot for the overhead channel, an 8-bit code is sent. This type of signal format allows one circuit to process all channels, one at a time.

For convenience, the output of equipment 2 and the input of equipment 6 are called TASI channels, and the input of equipment 2 and the output of equipment 6 are called PCM channels. Actually, the speech is PCM coded in both cases.

Figure 2:
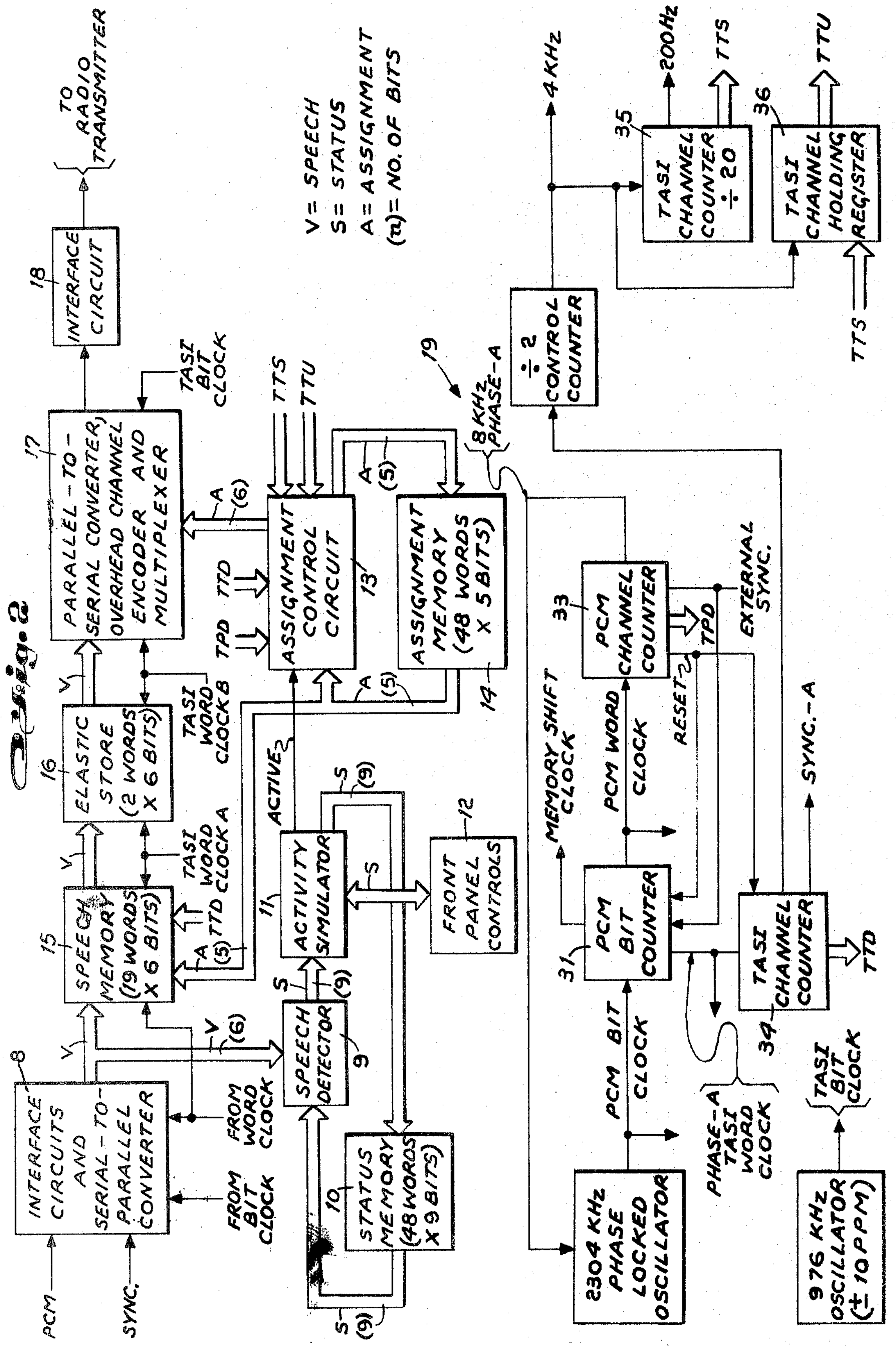
FIG. 2 is a block diagram of the TASI transmit equipment of FIG. 1 including the generator to produce the timing signals necessary for the operation thereof.
Figure 2A:
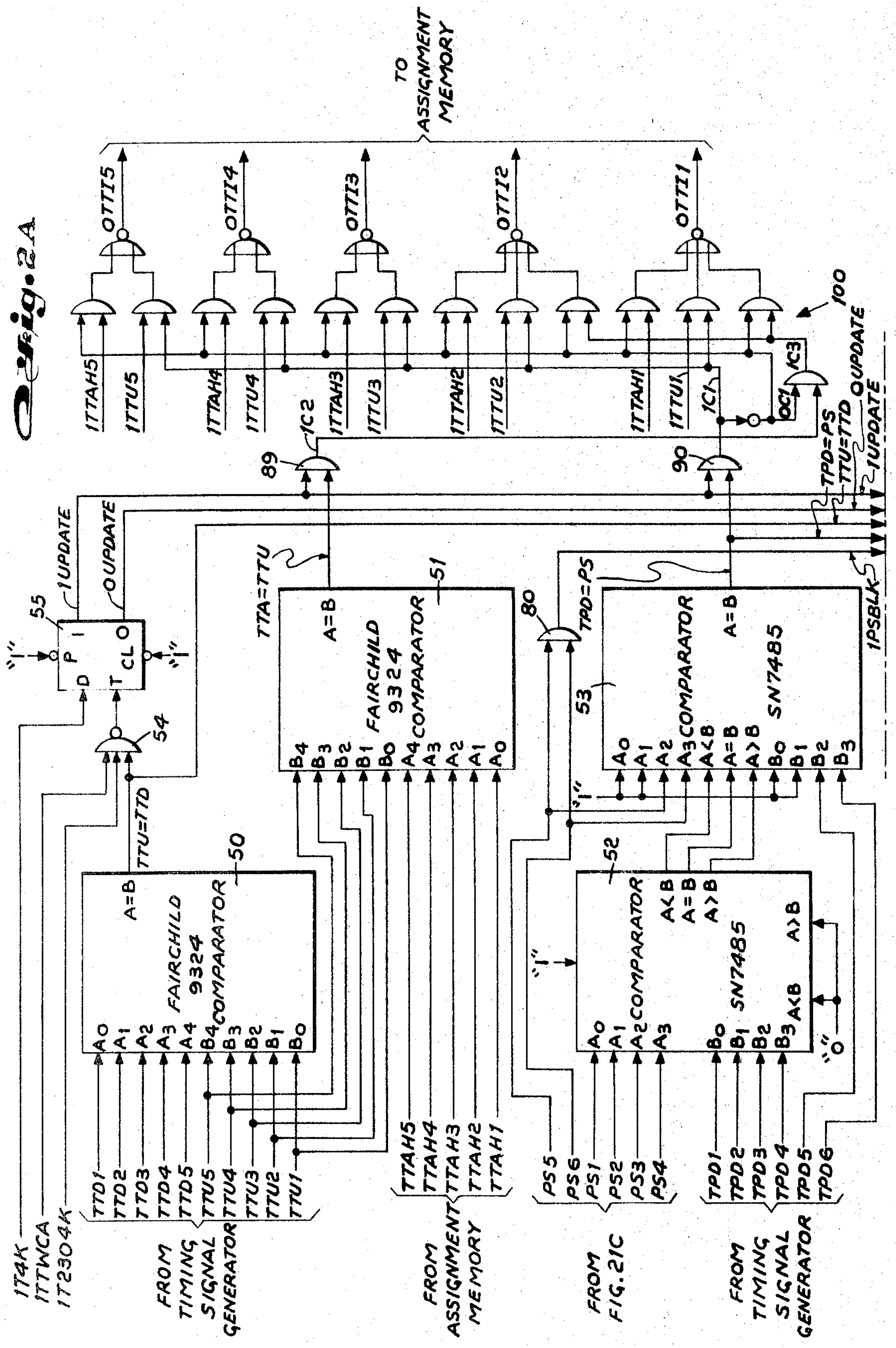

Referring to FIG. 2 the PCM input is coupled to the interface circuits and serial-to-parallel converter 8 to convert the serial PCM input to a parallel 6-bit format which is examined by speech detector 9. This speech detector preferrably is of the type disclosed in a first copending application of J. M. Clark (case 13), Ser. No. 371,191, filed June 18, 1973, whose disclosure is incorporated herein by reference. Speech detector 9 determines for each channel whether it is active or inactive, using a status word for each channel to average over many speech samples. The status words are taken from the status memory 10, processed by the speech detector 9 and the activity simulator 11 and returned to status memory 10. Activity simulator 11 also uses the status words to simulate random activity, steady activity, or steady inactivity for channels selected by the front panel controls 12. Simulator 11 also recognizes status words that indicate active status and sends an ACTIVE signal to the assignment control circuit 13. The ACTIVE signal has one time slot for each PCM channel. Simulator 11 preferrably is of the type disclosed in a second copending application of J. M. Clark (case 15), Ser. No. 377,686, filed July 9, 1973, whose disclosure is incorporated herein by reference. The assignment control circuit 13 controls the assignment (or correction) of PCM channels to TASI channels. The assignment of channels is stored in the assignment memory 14. The invention in the present application is directed to the assignment control circuit 13 and assignment memory 14. The PCM speech codes are written into speech memory 15 according to the sequence of PCM channels. As each PCM speech code arrives, the number of the assigned TASI channel is read out of the assignment memory 14 and is sent to speech memory 15 to indicate the location in the speech memory wherein the arriving PCM speech code should be stored. If no TASI channel is assigned, however, a "blank" code is read from assignment memory 14 and the PCM code is not stored in speech memory 15. The speech codes are read out of speech memory 15 according to the sequence of TASI channels. The speech codes read out pass through an elastic store 16 which allows for timing variations, are multiplexed with the overhead codes, are converted from parallel to serial format in parallel-to-serial converter, overhead channel encoder and multiplexer 17 the output of which is sent to the radio transmitter through interface circuit 18. The assignment control circuit 13 sends information from assignment memory 14 in the overhead channel so that the same information can be duplicated in a similar assignment memory in the TASI receive equipment. Assignment control circuit 13 also can change this information as required by finding a TASI channel assigned to an inactive PCM channel, and reassigning it to an active PCM channel having no assigned TASI channel. A frame synchronization code is also sent in the overhead channel. The timing signal generator 19 generates the various timing signals required in the operation of the TASI transmit equipment. The various counters and operation thereof to produce the necessary timing signals are believed to be well known in the art and, therefore, are not described in detail herein.

Figure 3:
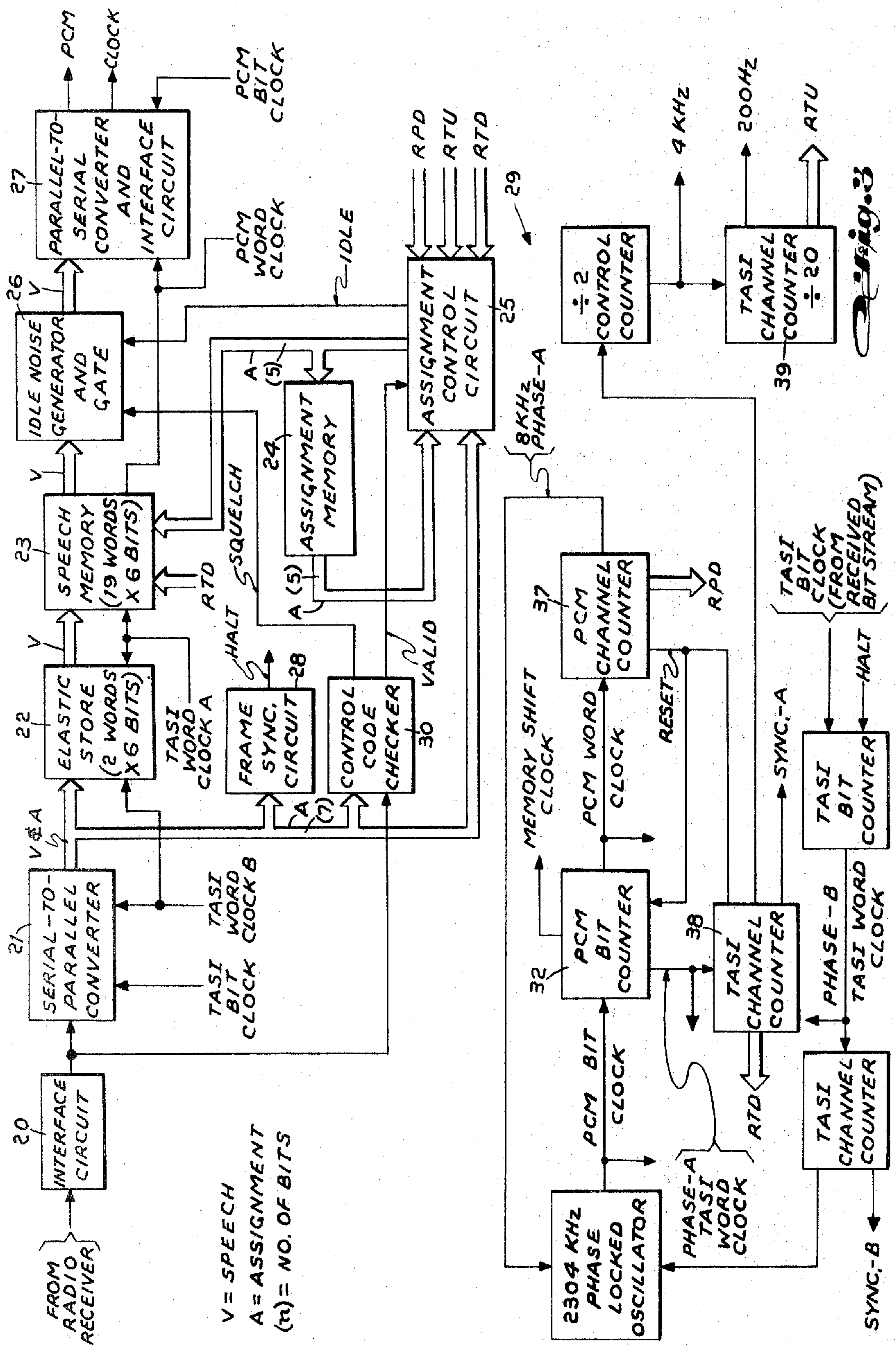
FIG. 3 is a block diagram of the TASI receive equipment of FIG. 1 including the generator to produce the timing signals necessary for the operation thereof.

Referring to FIG. 3 the speech codes from the radio receiver are coupled to interface circuit 20 in the TASI receive equipment and are converted from serial to parallel format in serial-to-parallel converter 21. The output of converter 21 passes through elastic store 22 to allow for timing variations and are written into speech memory 23 according to the sequence of the TASI channels. The PCM speech codes are read out of speech memory 23 according to the sequence of PCM channels. For each PCM speech code read, the number of the TASI channel assigned to the PCM channel is read from the assignment memory 24, and after processing by the assignment control circuit 25, is sent to speech memory 23 to indicate the location of the PCM code in speech memory 23. The invention of the present application is also directed to the assignment control circuit 25 and assignment memory 23. If no TASI channel was assigned to the PCM channel, a "blank" code is read from assignment memory 24, and no PCM code is read from speech memory 23. The "blank" code is recognized by assignment control circuit 25 which sends a IDLE signal to idle noise generator and gate 26 to insert an idle noise code into the speech signal path. This simulates the idle noise of an inactive (idle) channel. The speech codes are converted from parallel to serial format in the parallel-to-serial converter and interface circuit 27 before being sent to the output PCM interface. The frame sync circuit 28 recognizes the frame sync code in the overhead channel and uses this to synchronize the timing counters of the timing signal control generator 29 for the TASI receive equipment by means of a HALT signal. The frame sync circuit 28 may take many different known forms, but preferrably have the form disclosed in either U.S. Pat. No. 3,597,539 or U.S. Pat. No. 3,594,502, whose disclosures are incorporated herein by reference. Control code checker 30 checks parity bits of the assignment control codes received on the overhead channel. If the parity bits are correct, the control code is considered valid (indicated by the VALID signal) and is used by assignment control circuit 25 to update assignment memory 24 to duplicate the contents of assignment memory 14 of the TASI transmit equipment of FIG. 2. Control codes are ignored if not valid. Also, if most recent control codes are not valid, all control codes are ignored and a SQUELCH signal is sent to the idle noise generator and gate 26 to quiet all channels. This prevents noise and incorrect assignments when the radio signal fades. Timing signal generator 29 illustrated in FIG. 3 was referred to briefly hereinabove with respect to frame sync circuit 28. The purpose of this circuit is to produce the various timing signals for the operation of the TASI receive equipment. The various counters and operation thereof are believed to be well known in the art and, therefore, are not described in detail herein.

The invention disclosed herein is concerned with the assignment control arrangement of both the transmit equipment of FIG. 2 including assignment control circuit 13 and assignment memory 14 and the assignment control arrangement of FIG. 3 including the assignment control circuit 25 and assignment memory 24. This arrangement changes the assignment of the TASI (transmitted) channels to PCM (source) channels, to assure that all active PCM channels, up to 19 channels, are connected to TASI channels. That is, when an unconnected PCM channel becomes active, a TASI channel which is unconnected or is connected to an inactive PCM channel, is connected instead to the PCM channels that became active. Also, the assignment (connection) information is sent to the receive equipment of the TASI system to make corresponding connections from the received TASI channels to the outgoing PCM channels.

To explain the operation of the assignment control arrangement, there must be first explained the data formats involved, the means of connecting PCM and TASI channels, the organization of the memories used, and the timing of basic operations.

Figure 4:
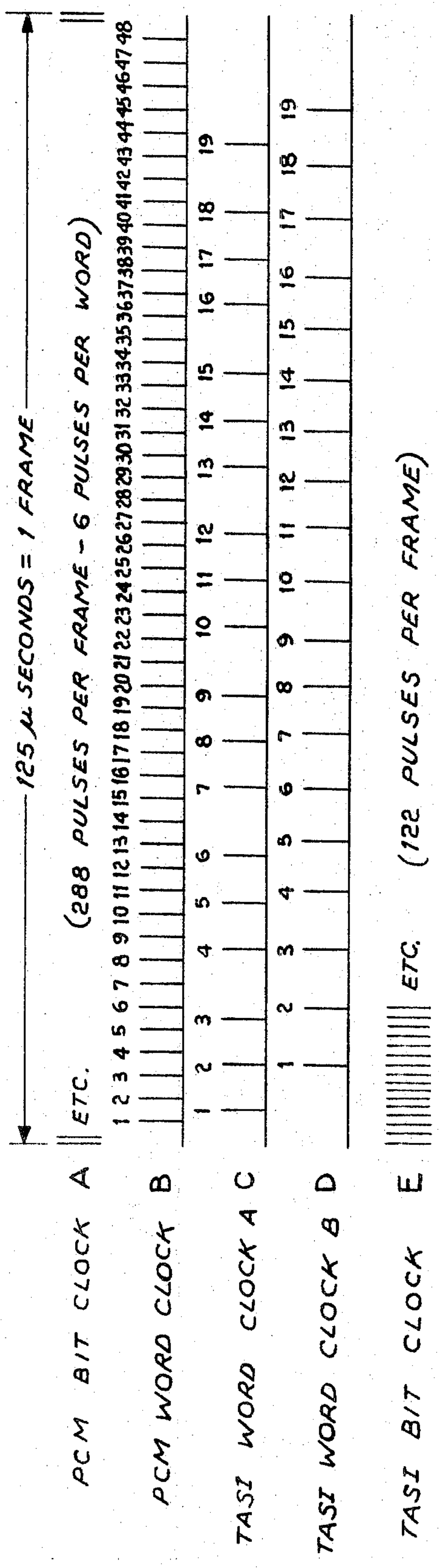
FIG. 4 is a timing diagram of the various clocks employed in the TASI communication system of FIG. 1.

The data format of the PCM signal entering the transmit equipment and leaving the receive equipment is a 288-bit frame. The frame is 125 usec (microsecond), consisting of 48 6-bit words entering serially. Internally, the words are transferred in parallel (six bits at a time). Each 6-bit word is a PCM code representing a sample of a speech channel. The 48 words of one frame correspond to one sample each of 48 channels, and are arranged in sequence from channel 1 to channel 48. Timing signals from the data source identify the bit, word and frame timing as illustrated in FIG. 4 and are used to synchronize appropriate timing circuits in the transmit equipment. It should be noted with respect to FIG. 4 that the TASI word clock B shown is for the transmit equipment. This clock is about two words earlier than shown for the receive equipment.

Figure 5:
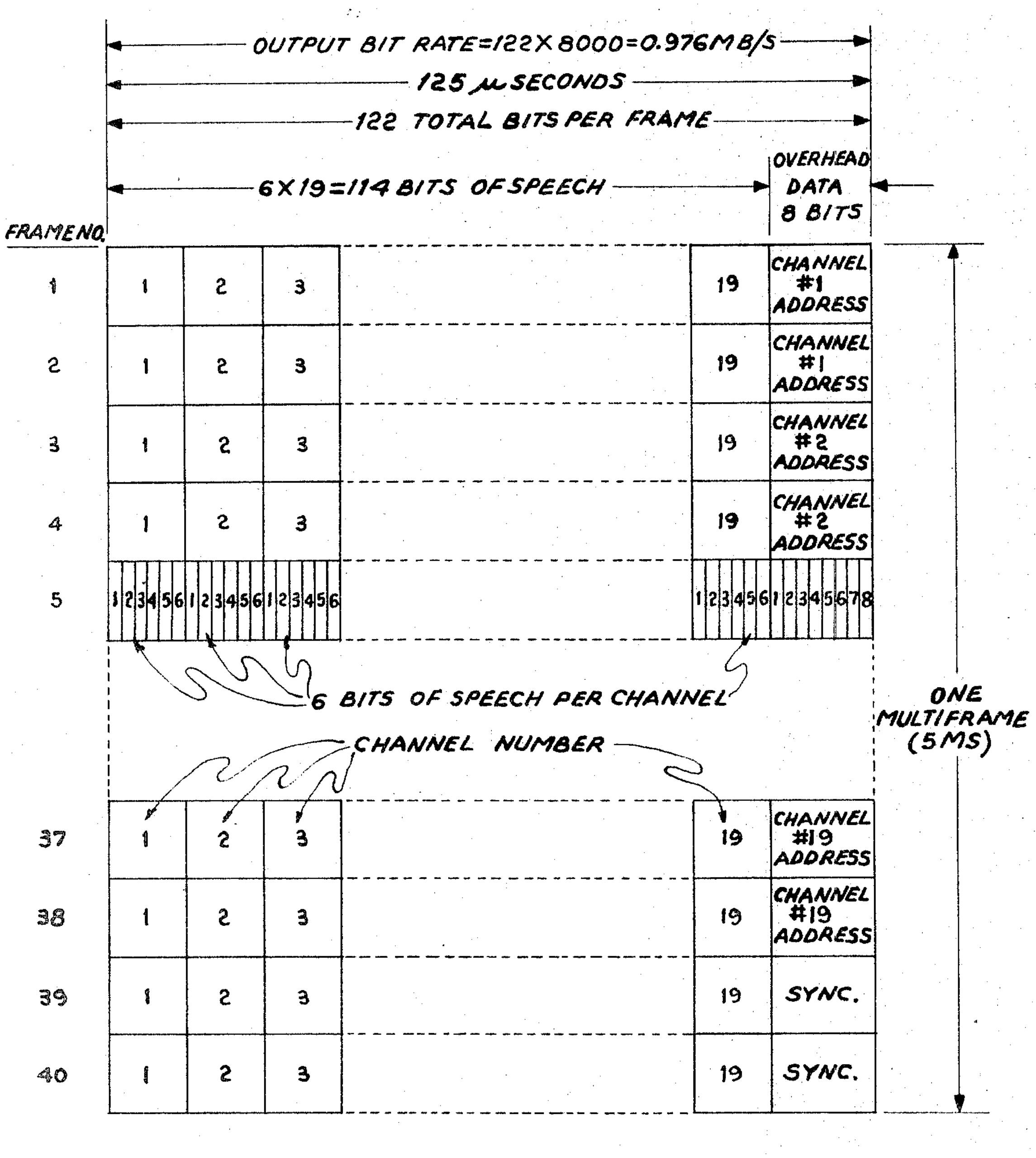
FIG. 5 is a data format of the TASI signal in accordance with the principles of the present invention.

The data format signal leaving the transmit equipment and entering the receive equipment also uses a 125 usec frame. However, it has 122 bits per frame, comprised of 19 6-bit words (PCM codes, one for each TASI channel, in sequence) and an 8-bit word. Actually, two 8-bit words in a pair of consecutive frames are used as a 16-bit control code or sync code, so that the 8 bits are more properly called a half word. Twenty pairs of frames (40 frames) form a "multiframe" containing 19 control words and one sync word as illustrated in FIG. 5. The control words are associated with the 19 TASI channels, in sequence, and are used to identify the PCM channel to which the associated TASI channel has been assigned.

The basic timing and data flow in the TASI transmit and receive equipment is shown in FIGS. 2 and 3. The signals marked V carry the coded speech channels, and show the flow of speech data from the speech source through the transmit equipment (FIG. 2), through the transmission system and the receive equipment to the data output (FIG. 3). Also shown in these two Figures are the clock signals used to transfer data at each point in the appropriate equipment. Each pulse of a bit clock is used to transfer a bit of serial data, and each pulse of a word clock is used to transfer a word of parallel data. The PCM bit clock and PCM word clock are associated with the bit and word timing of the PCM data format, and the TASI word clock B and TASI bit clock are associated with the TASI data format. There is a counter in generator 19 of FIG. 2 and generator 29 of FIG. 3 associated with each word clock shown which identifies each pulse (thus each word) as they are numbered in FIG. 4. These numbers identify the speech channels.

The reason for using two TASI word clocks (A and B) and the elastic store 16 of FIG. 2 and elastic store 22 of FIG. 3 is as follows. Suppose only a TASI word clock B is employed. When, for example, PCM channel 13 is connected to TASI channel 10, the words entering the transmit speech memory 15 of FIG. 2 on PCM channel 13 leave the speech memory on TASI channel 10. In each frame, a word is written into the speech memory at PCM word clock pulse 13 and read out the TASI word clock pulse 10. If, instead, PCM channel 13 were connected to TASI channel 4, the word would be read from the speech memory at TASI word clock pulse 4 of the next frame, because TASI word clock pulse 4 precedes PCM word clock 13 in one frame (the frame starting and ending as shown in FIG. 4). However, the time that the word waits in the memory (delay through the memory) can never be more than one frame period (125 usec).

There is a similar situation at the receive speech memory 23 of FIG. 3. But considering a few samples (such as two above examples) it is easily seen that the total delay of both the transmit speech memory 15 and the receive speech memory 23 is always exactly one frame period.

But now suppose PCM channel 13 is connected to TASI channel 5. FIG. 4 shows PCM word clock pulse 13 coinciding with TASI word clock B pulse 5. The question may be asked is the word entered into the speech memory and read out at the same time (with zero delay), or is the word read on the TASI word clock pulse 5 of the next frame (one frame delay)? The answer depends on the exact circuit delay and the exact phase difference of the two pulses. A small timing error can make a bit difference in the delay through the speech memory.

Also, if there is a small timing variation, an entire word can be either lost or repeated when the pulses pass each other, disturbing the proper sequence of words in the channel. Also, if the transmit equipment changes a connection, transmitting an indication of the new connection by a control word, how will it be known when the new connection at the receive equipment should begin if the delay of the connected data is uncertain?

Suppose an attempt to avoid this uncertainty is made by moving the TASI word clock B toward the left on FIG. 4. That is, designing the time circuits so that the clock pulses occur earlier. This brings TASI word clock 2 closer to PCM word clock 6 and TASI word clock 8 to PCM word clock 20. Instead suppose the TASI word clock B is moved toward the right. However, this moves TASI word clock 19 closer to TASI PCM word clock 46, TASI word clock 16 closer to PCM word clock 39 and TASI word clock 13 closer to PCM word clock 32. However these two word clocks are arranged, there is always some connection that will cause trouble, because the pulse spacing of the two connections are not in agreement.

The problem is solved by TASI word clock A, which has pulses three PCM bit periods after PCM word clock pulses. The TASI word clock A is generated from the PCM bit clock and timing counter 31 of generator 19, FIG. 2 and counter 32 of generator 29, FIG. 3, and has no problem with timing error. Comparing the PCM word clock and the TASI word clock A, it can be seen that no two pulses occur at the same time, and, therefore, by using TASI word clock A for reading from the speech memory, the speech delay is always certain. The pulses of TASI word clock A, however, are not equally spaced and cannot coincide with the timing TASI format. Therefore, an elastic store 16 (FIG. 2) is employed in the transmission section to transfer the data from the TASI word clock A timing to the TASI word clock B timing. As shown in FIG. 4, the TASI word clock B timing lags the TASI word clock A timing by about one word period, with variations of about half word period, due to the unequal spacing of the TASI word clock A pulses. The elastic store can store as many as two words at a time, with independent read and write timing, and assures that words are read in the same sequence as they are written. The delay through the elastic stores 16 can be between zero and two word periods, and therefore a half word period timing error can be allowed in addition to the half word variation already mentioned. An elastic store 22 (FIG. 3) in the receive equipment transfers the data from TASI word clock B timing to TASI word clock A timing. In this case, the TASI word clock B is approximately one word ahead of the TASI word clock A.

The transmit and receive equipment of the TASI communication system as shown in FIGS. 2 and 3 each have three memories that are important to the operation of the assignment control arrangement. The organization of these memories will now be discussed. The discussion will be concerned with the transmit equipment of FIG. 2, but similar considerations also apply to the receive equipment of FIG. 3.

Referring to FIG. 2 assignment memory 14 indicates which TASI channel (if any) is assigned to each PCM channel. This can be done with a memory of 48 words of 5 bits each. For any PCM channel P which is connected to TASI channel T, the number T is stored at the address P of memory 14. P is a digital number from 1 through 48 and T is a digital number from 1 through 19. If PCM channel P is not connected, a "blank" code is stored. A "blank" code can be represented by any unused number, such as 20. Alternately, a 19-word memory could be used to store P at the address T. The first scheme is called "P → T" because T can be immediately found if P is known. The second scheme (P stored at T) is called "T → P."

Speech memory 15 stores speech words temporarily to transfer these words from the PCM format to the TASI format (visa versa in the receive equipment of FIG. 3). A 48-word memory can be employed and each word is stored at an address corresponding to the PCM channel. This memory scheme is called organization P → V, because if the PCM channel is known, the speech word can immediately be found. Alternatively a 19-word memory could be used, and words would be stored at addresses corresponding to TASI channels. This is called T → V (from T, find V) organization. The P → T and T → V organization can be used for the assignment and speech memories together, as follows. When writing a word from the PCM data format into speech memory 15, it is required to know where to store it. Timing counter 31 associated with the PCM word clock is synchronized to the data format, and specifies the PCM channel P. P is taken from timing counter 31, and reads the word stored at address P of assignment memory 14. This word is T, the address of the word location of the speech memory 15 where the speech word must be stored. The word must later be read from speech memory 15 to be transmitted in the TASI data format. At the time this is done, timing counter 34 associated with TASI word clock A indicates the TASI channel number T, which is the address of the speech memory location storing the speech word to be read.

Similarly, the T → P, P → V can be used together. When writing a word from the PCM data format into speech memory 15, the PCM channel timing counter 33 gives the speech memory location P directly. When reading from speech memory 15 to transmit a speech word in the TASI data format, the TASI channel timing counter 34 indicates the TASI channel T, and the word read from address T of assignment memory 14 is P, the address of the speech word to be read from speech memory 15.

Status memory 10 stores in the activity status of each PCM channel, as well as the mode and other data required to either detect or simulate changes of this status. This memory requires 48 words because the status of all 48 PCM channels must be continually monitored. The organization of memory 10 can be designated P → S (S for status).

A change of activity status implies a need to change the assignment (connection) of TASI channels to PCM channels. If a PCM channel and a TASI channel are connected, and the PCM channel become inactive, the TASI channel is not needed (no speech signal to send) and is available to be assigned to any other PCM channel which may be active and needing a connection. However, the indication that the PCM channel became inactive is not sufficient cause (by itself) to require disconnecting the channel. The inactivity is often only a pause between syllables or words, and activity will begin again soon. Also, other TASI channels may also be available, or there may be no unconnected and active PCM channel needing the available TASI channel.

If a PCM channel becomes active, and it is not presently connected, an available TASI channel must be found and a connection established as quickly as possible, to avoid "clipping the talkspurt". That is, not getting the first part of a word or syllable through the transmit equipment, transmission system and receive equipment. It does no good to connect the channels in the transmit equipment and to transmit the speech channel until after a control word is first sent to the receive equipment to indicate the new connection. Until the control word is sent, the receive equipment cannot make the corresponding connection.

Once every two frames, a control word is sent (except for a sync word in the last two frames of the multiframe). The time within the multiframe at which the control word is sent indicates a TASI channel number. The control word is a PCM channel number (or else a "blank" code) plus check bits for detection of errors. For example, if the 12th control word in the multiframe is number 42, plus check bits, this indicates that TASI channel 12 is assigned to PCM channel 42. If a blank code is sent, the TASI channel is not connected (unassigned). The same control words are sent repeatedly every multiframe until the assignments change.

Once every two frames, the assignment control equipment can decide whether the next control word to be sent should be different than the control word sent one multiframe earlier. That is, there are two frames of available time to review the status and assignment of channels, determine if any changes are appropriate at this time, update (change) the assignment memory as required, and send a control word. The control word is used to update the assignment memory 24 of the receive equipment of FIG. 3 to match the transmit assignment memory 14. Since the assignment memory contents control the flow of data through the speech memory from the PCM format to the TASI format (visa versa for the receive speech memory), updating the assignment memory 14 changes the connections of PCM and TASI channels.

The task of the transmit assignment control arrangement is conveniently divided in two parts which are called the search cycle and the update cycle. The search cycle determines what the next control word will be. The update cycle changes assignment memory 14 to agree with the control word. The receive assignment control arrangement has only an update cycle, which uses the received control word, and is similar to the transmit update cycle.

The search cycle is defined as follows:

1. Find at least one PCM channel which is active and not connected. If such a channel can be found, call it P*a*. If no such channel can be found, P*a* is called "blank" (blank code).
2. Find at least one PCM channel which is connected to the TASI channel T corresponding to the next control word. If there is such a channel, call it P*c*. If TASI channel T is not connected, P*c* is called "blank."
3. Determine if TASI channel T is "available." Channel T is available if P*c* is blank or is an inactive PCM channel.
4. The next control word is P*s* (plus check bits) determined as follows: if T is available and P*a* is not blank (a new connection can be made), then $Ps = Pa$. Otherwise, $Ps = Pc$ (indicating the same connection as before).

Task (1) of the above list may require an examination of all PCM channels, because if the first 47 channels examined are either inactive or connected, P*a* is not determined until the 48th channel is examined. Also, for each channel, a check must be made for both activity status (from the status memory) and connection status (from the assignment memory). If the P → T organization is used for the assignment memory, the activity and connection status can simultaneously be examined for any PCM channel, because the status memory organization is P → S. For any PCM channel P, TASI channel T (TASI channel number, or blank) is read from the location P of the assignment memory and S (status) from location P of the status memory. If S is "active" and T is "blank" (no connection), the PCM channel P is the P*a* for which the equipment is searching. In one frame period, the PCM channel timing counter 33 provides the PCM channel numbers, in sequence, for all of the PCM channels, and the activity and connection status of all the PCM channels can be obtained, and P*a* can be determined.

If the T → P organization were used for the assignment memory, the status and assignment memories cannot be read in the same channel sequence, and all of the PCM channels could not be examined to find P*a* in one frame period. For this reason, the memory organizations chosen are:

P → S (status memory 10)
P → T (assignment memory 14)
T → V (speech memory 15).

The following list defines the update cycle. It should be recalled that each update cycle in the transmit equipment of FIG. 2 is associated with a control word including the PCM channel number (or blank code) P*s* determined by the search cycle, to be sent during the pair of frames corresponding to TASI channel T. The same statement may be made for the receive section of FIG. 3, except that P*s* is received rather than sent. During the update cycle, the entire assignment memory 14 is alrays read once.

1. If P*s* is blank (indicating that TASI channel T should not be connected), and if any word read from memory 14 is T, indicating a connection to TASI channel T, replace this word by writing "blank" (indicating no connection) into assignment memory 14.
2. If P*s* is not blank (indicating that TASI channel T should be connected to PCM channel P*s*), and a word is read from memory 14 location P*s*, replace this word with word T. This indicates that channel T is connected to channel P*s*.
3. If P*s* is not blank, and any word read from any word location other than location P*s* is T (indicating that a PCM channel other than P*s* is connected to TASI channel T), then replace this word with "blank." This disconnects TASI channel T from any and all PCM channels except PCM channel P*s*.
4. If none of the above conditions are met, write into the assignment memory 14 the same word that is read from memory 14 (that is, make no change).

Notice that the rules set forth hereinabove for the search and update cycles provide for connecting any active and unconnected PCM channel to any TASI channel which is either unconnected or connected to an inactive PCM channel. Note that a TASI channel is disconnected only when it is necessary to reconnect it to a different PCM channel. Note also that the search rules include the phrase "find at least one PCM channel which is...", and the update rules include the phrase "any word read." These conditions are included to take care of "nonsense data" that may be in assignment memory 14 when power is first turned on. For example, a TASI channel number might appear in several word locations of assignment memory 14, indicating that this TASI channel is connected to several PCM channels. Or, a TASI channel number may be nowhere in memory 14, indicating no connection. The search logic finds at least one valid connection, if any, and the update logic removes all connections that conflict with the valid connection that was found.

Figure 6:
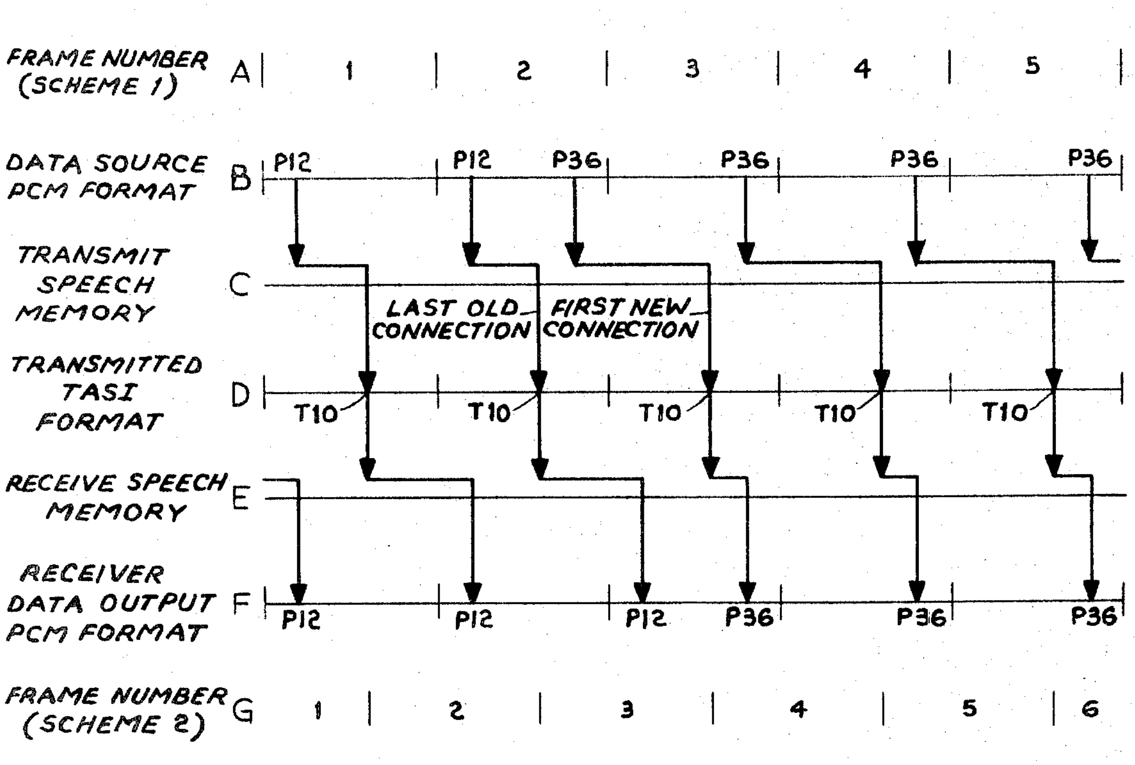
FIGS. 6 and 7 are typical timing diagrams illustrating typical assignment changes in accordance with the principles of the present invention.
Figure 7:
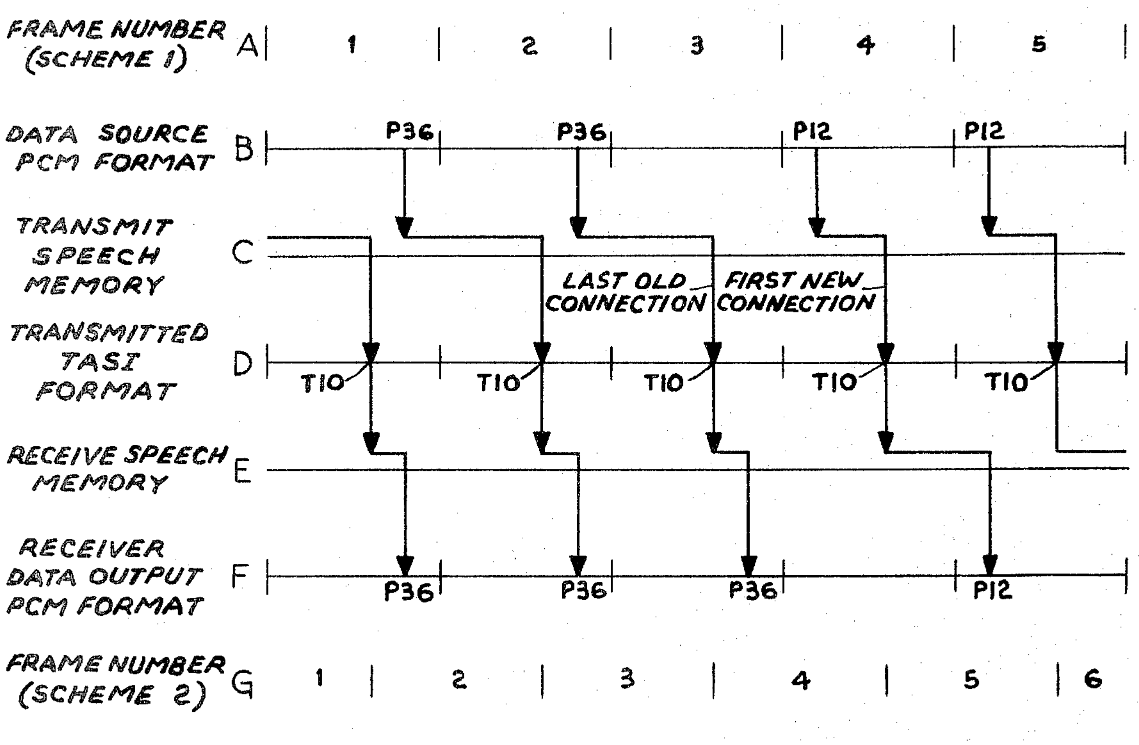

It is necessary to coordinate the timing of connections and disconnections in the transmit equipment and receive equipment to avoid creating noises. FIGS. 6 and 7 show the timing for two typical situations. In these "space-time" diagrams, time advances horizontally to the right, and different places along the data path are indicated by vertical lines, from top to bottom. The movement of typical speech samples (PCM code words) are shown by downward zig-zag paths. Each downward arrow is a transfer to or from a speech memory, and the connecting horizontal segments represent the length of time that the speech sample is delayed in a speech memory. Other path delays are ignored in these diagrams.

FIG. 6 shows PCM channel 12 (P12) being transmitted by a TASI channel 10 (T10) then T10 is connected from P12 and connected to P36 instead. FIG. 7 shows the opposite change (switching from P36 to P12). In each case, the paths corresponding to the last speech sample sent on the old connection and the first speech sample sent on the new connection are identified. A time scale in Curve A of FIGS. 6 and 7 show the numbering of the frames, where each frame starts just before the first PCM channel and just after the last PCM channel. A second scheme, shown in Curve G of FIGS. 6 and 7, number the frames that start and end at the TASI channel being connected (T10 in this case). According to the first scheme (Curve A, FIGS. 6 and 7), there are two transmit PCM channel connections in frame 2 of FIG. 6, and two receive PCM channel connections in frame 3. In FIG. 7 there are no transmit connections in frame 3 according to the frame numbering scheme of Curve A, FIG. 7 and no receive connections in frame 4. FIG. 6 indicates that PCM channel P36 should be connected during one frame and P12 disconnected during the next frame. FIG. 7 indicates the reverse, namely, the disconnect precedes the connect by one frame. Other examples could be presented showing a need to connect and disconnect during the same frame. These various possibilities don't quite make control of the connect-disconnect timing impossible, but they do make it quite complicated.

These complications vanish, however, if the frame numbering scheme 2 of Curve G, FIGS. 6 and 7 for defining the beginning and end of frame periods is employed. FIGS. 6 and 7 show that one and only one PCM channel is connected during one of these frames, and the TASI channel is always transmitted at the end of one frame and the beginning of the next frame. Note also that the receive PCM channel data always lags the transmit PCM channel by exactly one frame.

Figures 8, 10:
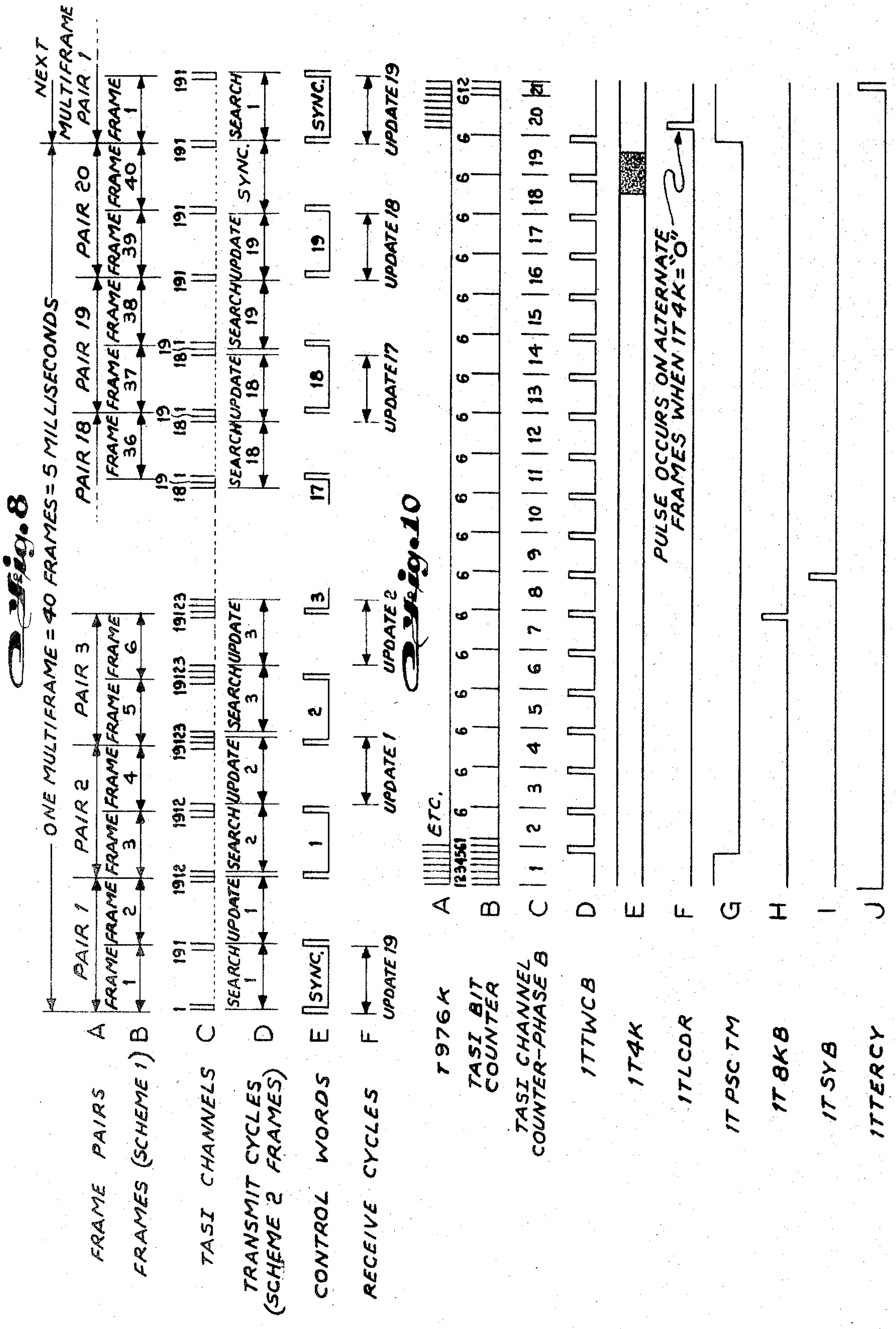
FIG. 8 is a summary of various timing signals employed in the assignment control arrangement in accordance with the principles of the present invention.
FIGS. 9, 10, 11 and 12 are timing diagrams illustrating the operation of the transmit equipment of FIG. 2 in accordance with the principles of the present invention.
Figure 9:
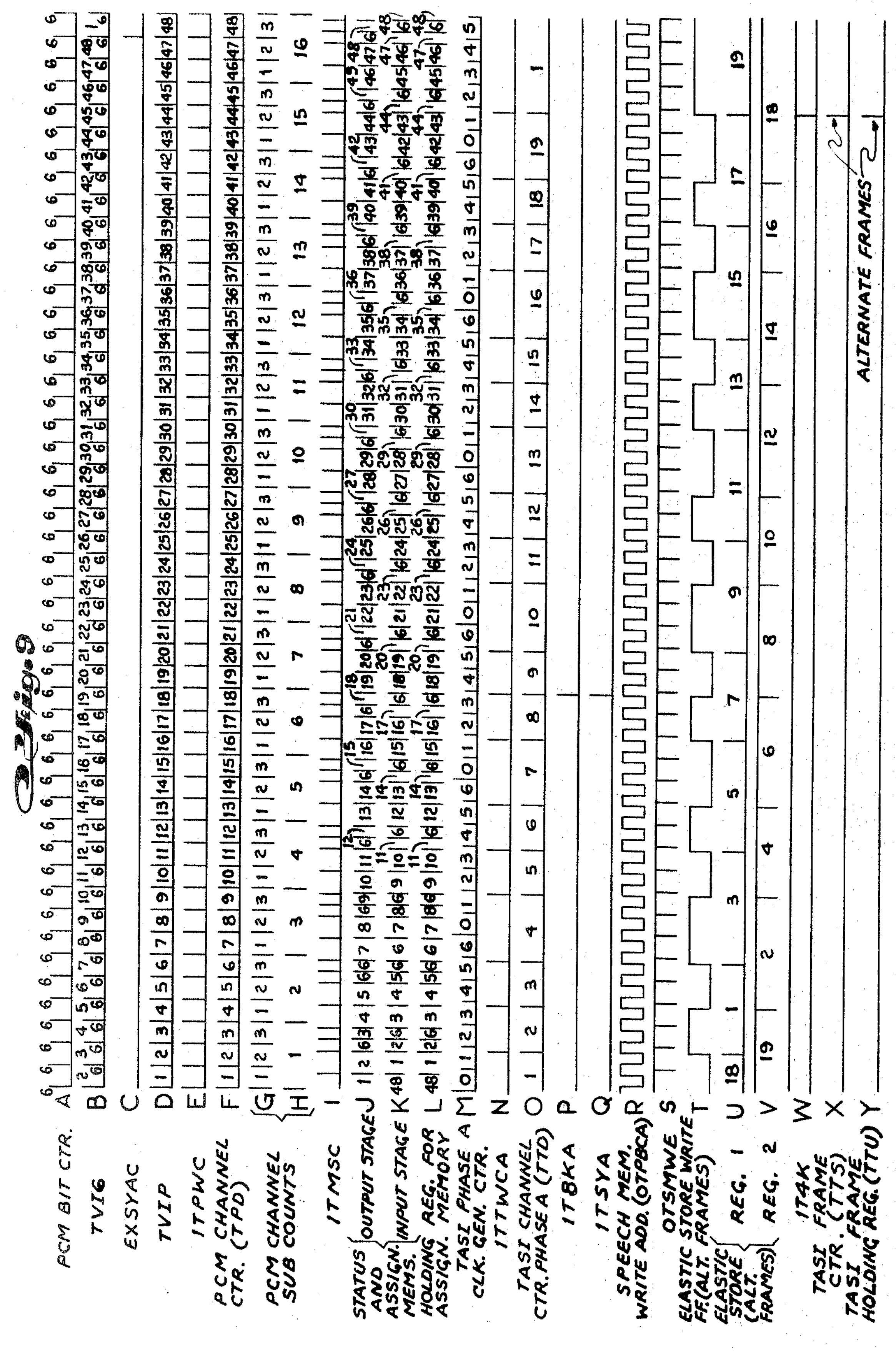
Figure 11:
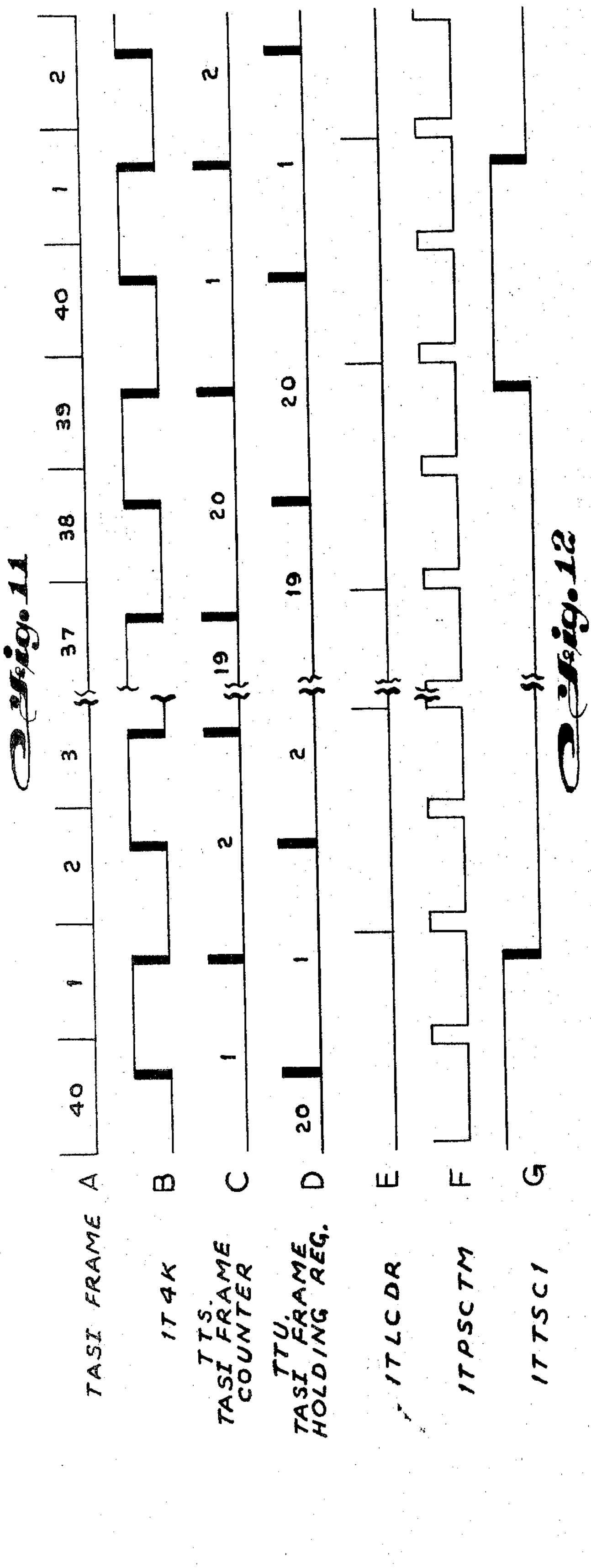
Figure 12:
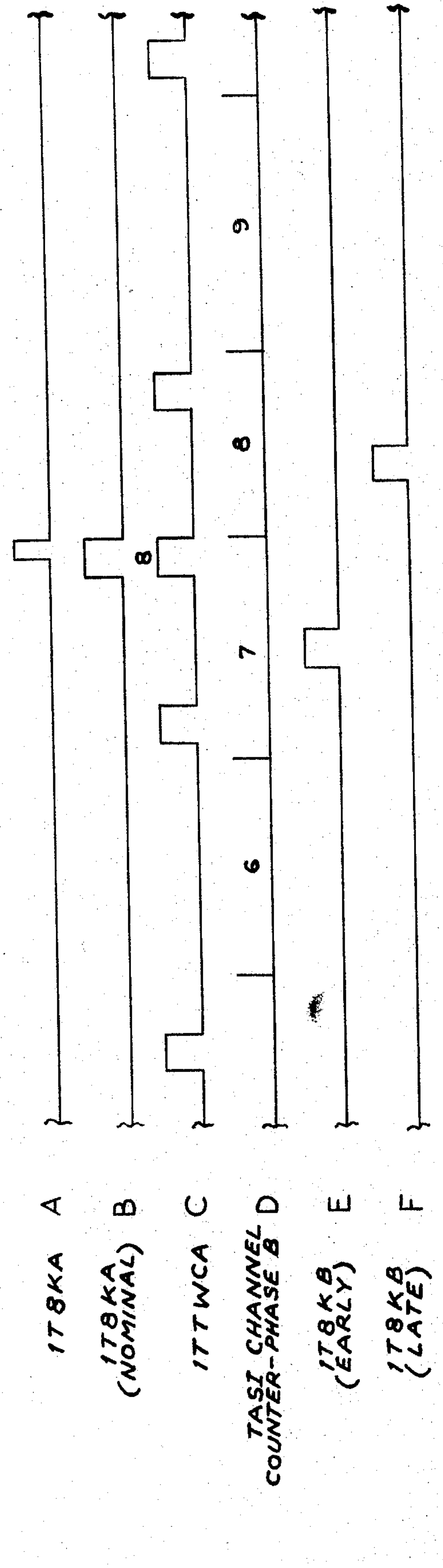
Figure 13:
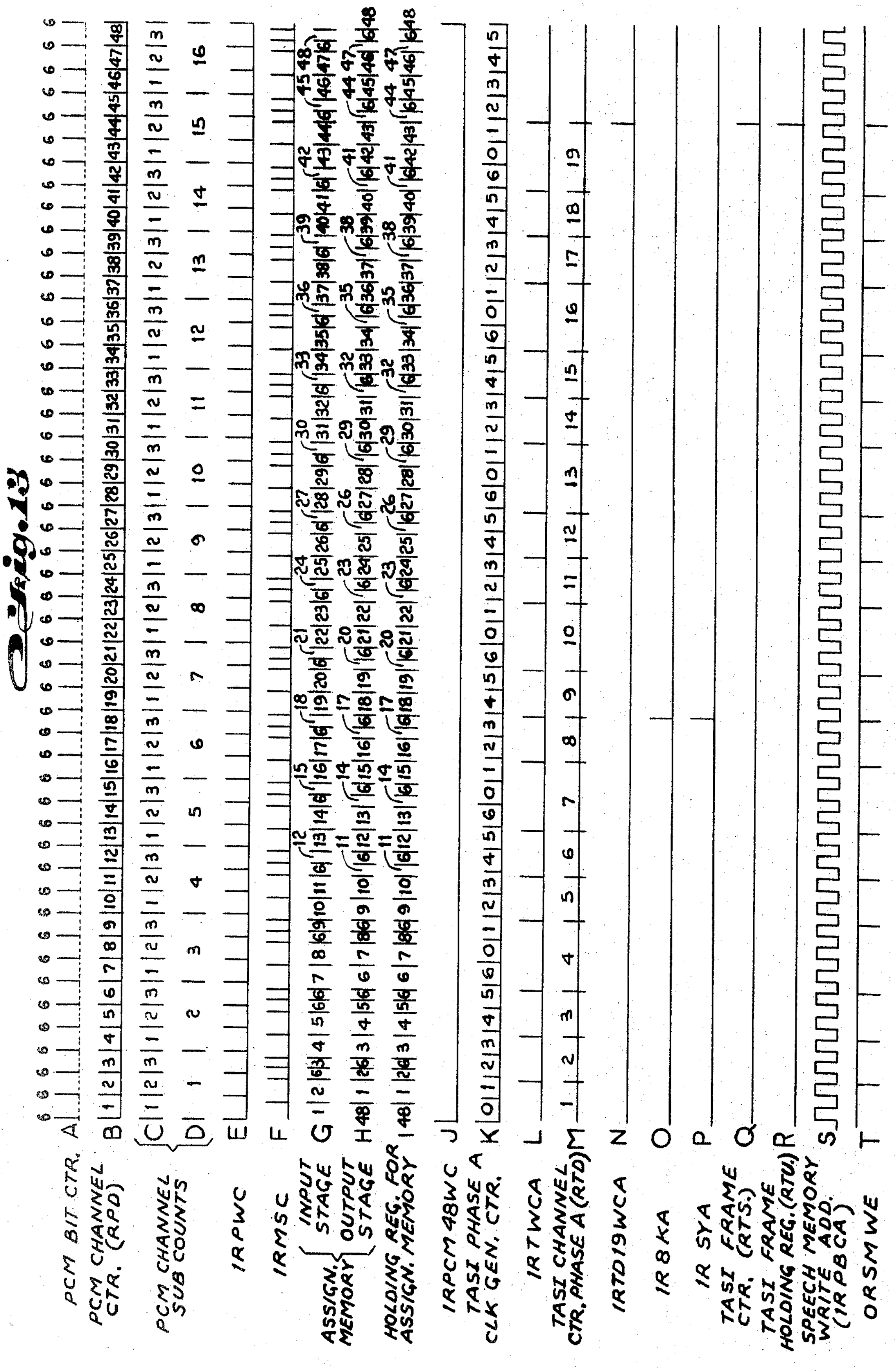
FIGS. 13, 14, 15 and 16 are timing diagrams illustrating the operation of the receive equipment of FIG. 3 in accordance with the principles of the present invention.
Figure 14:
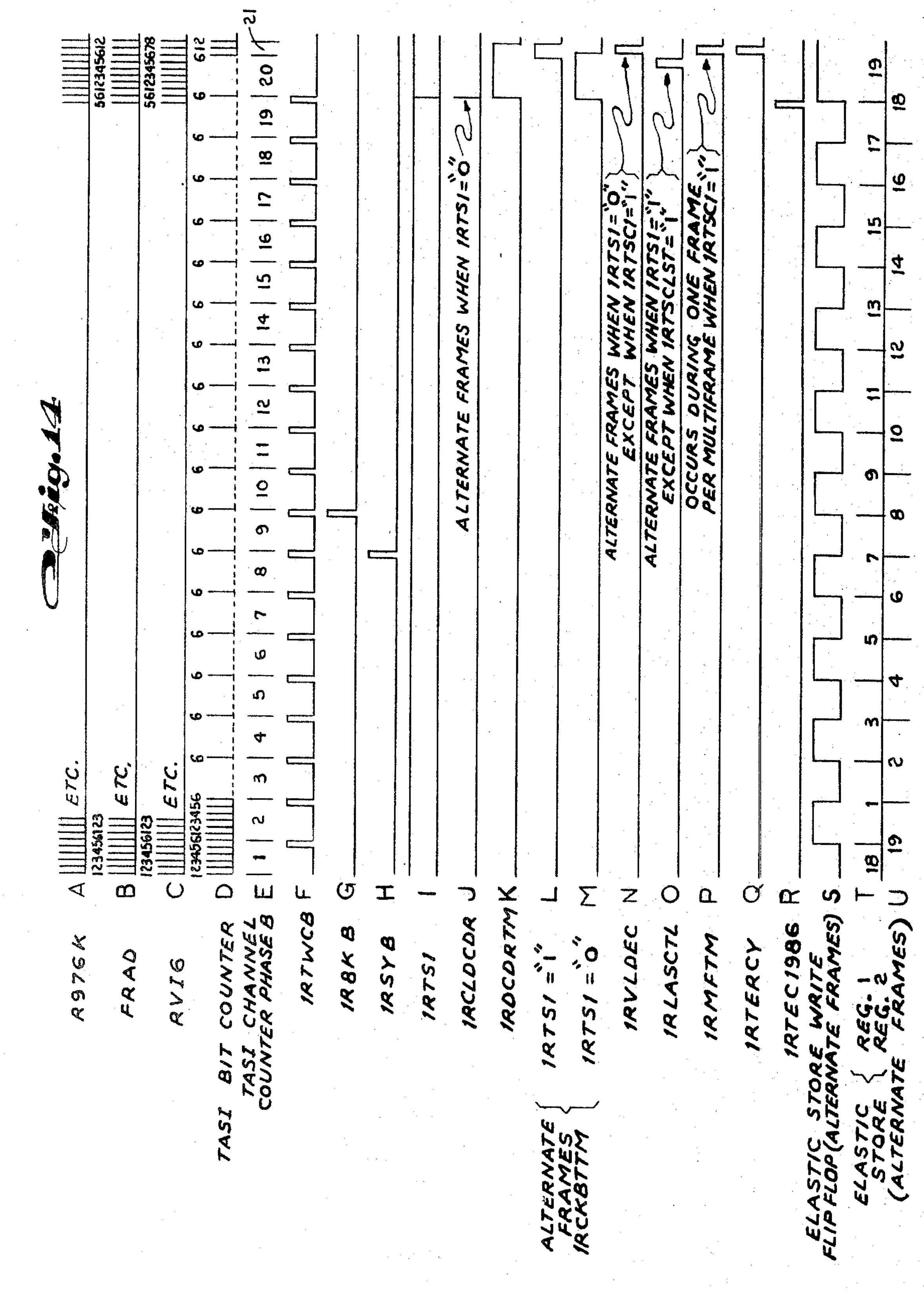
Figures 15, 16:
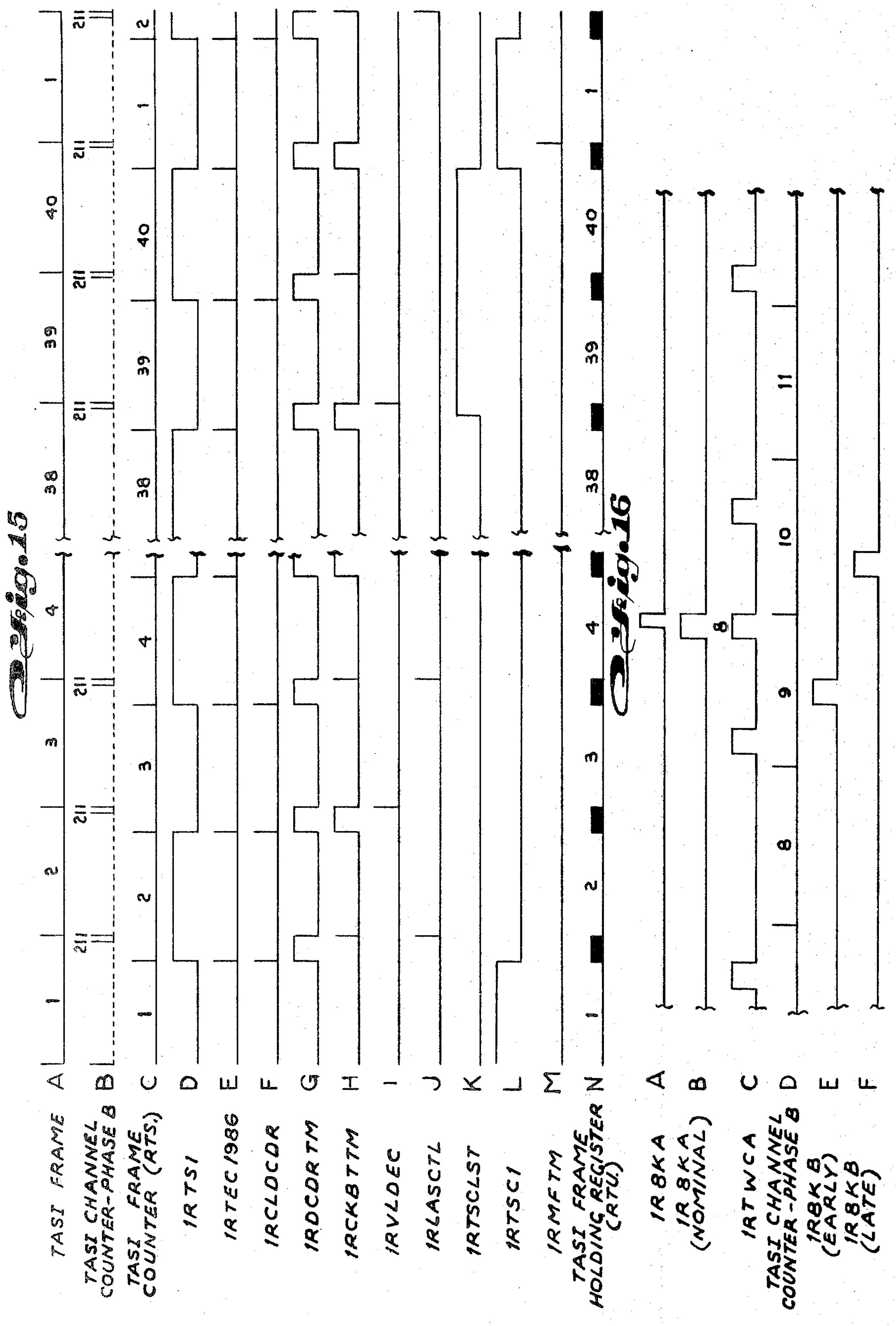

Since the frames start and end at the TASI channel, that is, have its connection changed, the starting times of the frames must change as the TASI channels are processed by the assignment control equipment one at a time. For this reason, the timing of the search and update cycles is arranged as shown in Curves D and F of FIG. 8. First, frames and pairs of frames are numbered according to the frame numbering scheme 1 referred to with respect to FIGS. 6 and 7. Then the search and update cycles are defined according to the frame numbering scheme 2 as referred to with respect to FIGS. 6 and 7. Search cycle $n$ and update cycle $n$, where $n$ is any integer from 1 to 19, start at TASI channel $n$ of the first and second frames respectively of pair $n$. FIG. 8 shows that the search and update cycles move over one word period relative to the timing of scheme 1 after each pair of frames. After nearly one multiframe, the search and update cycles have moved nearly one frame leaving only one frame associated with pair 20 and the synchronization word. The first 19 pairs are associated with control words, one for each TASI channel.

The control words and sync word are 16-bit words each sent in two 8-bit half words. The timing of each half word is shown as a pulse in Curve E, FIG. 8. The update cycles of the receive equipment are about two frames later than the corresponding update cycles of the transmit equipment. Compare Curves D and F of FIG. 8. Of these two frames, there is a one frame delay because that is how long it takes to send a compare control word. The other one frame of delay is caused by the sliding of the search and update cycles relative to the data format which has scheme 1 timing. The control words cannot be sent much earlier, because search cycle 19 is barely completed in time to send control word 19. The receive update cycle cannot be done much earlier, because receive update cycle 1 is started immediately after the end of control word 1. The two frame delay between transmit and receive update cycles is partly compensated by the fact that the search data is always delayed one frame from the time it enters the transmit speech memory until the time it exits the receive speech memory, as previously noted. Compensation for the remaining one frame of delay is achieved by different connections between the assignment and speech memories in the transmit and receive equipments. In FIG. 2, the write address for speech memory 15 is obtained from the output of assignment memory 14. Therefore, a update made by the assignment control circuit 13 is not immediately effective. The new assignment put into the assignment memory 14 by assignment control circuit 13 is read out of assignment memory 14 one frame later to be used to address speech memory 15. In FIG. 3, the read address for speech memory 23 is obtained from the input of assignment memory 24, which is the output of assignment control circuit 25. Therefore, a new assignment generated by the update logic of assignment control circuit 25 is immediately applied to speech memory 23 as an address. This matches the delay of the assignment information, so that even though the receive equipment lags behind the transmit equipment, there is the same lag for both speech data and assignment control.

Figure 17A:
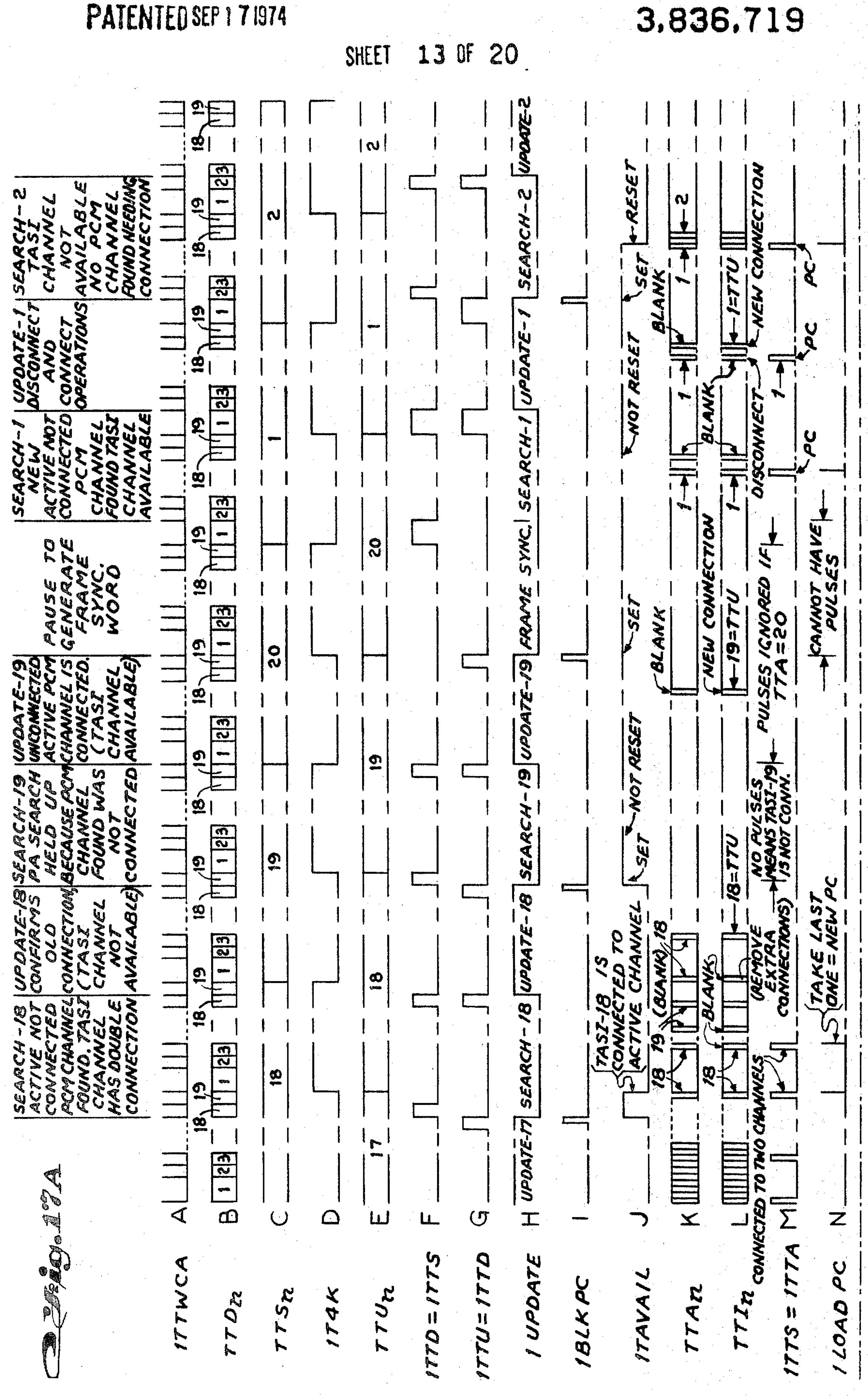
FIGS. 17A and 17B, when organized as illustrated in FIG. 17C, is a typical timing diagram illustrating a typical operation of the TASI transmit assignment control arrangement in accordance with the principles of the present invention.
Figures 17B, 17C:
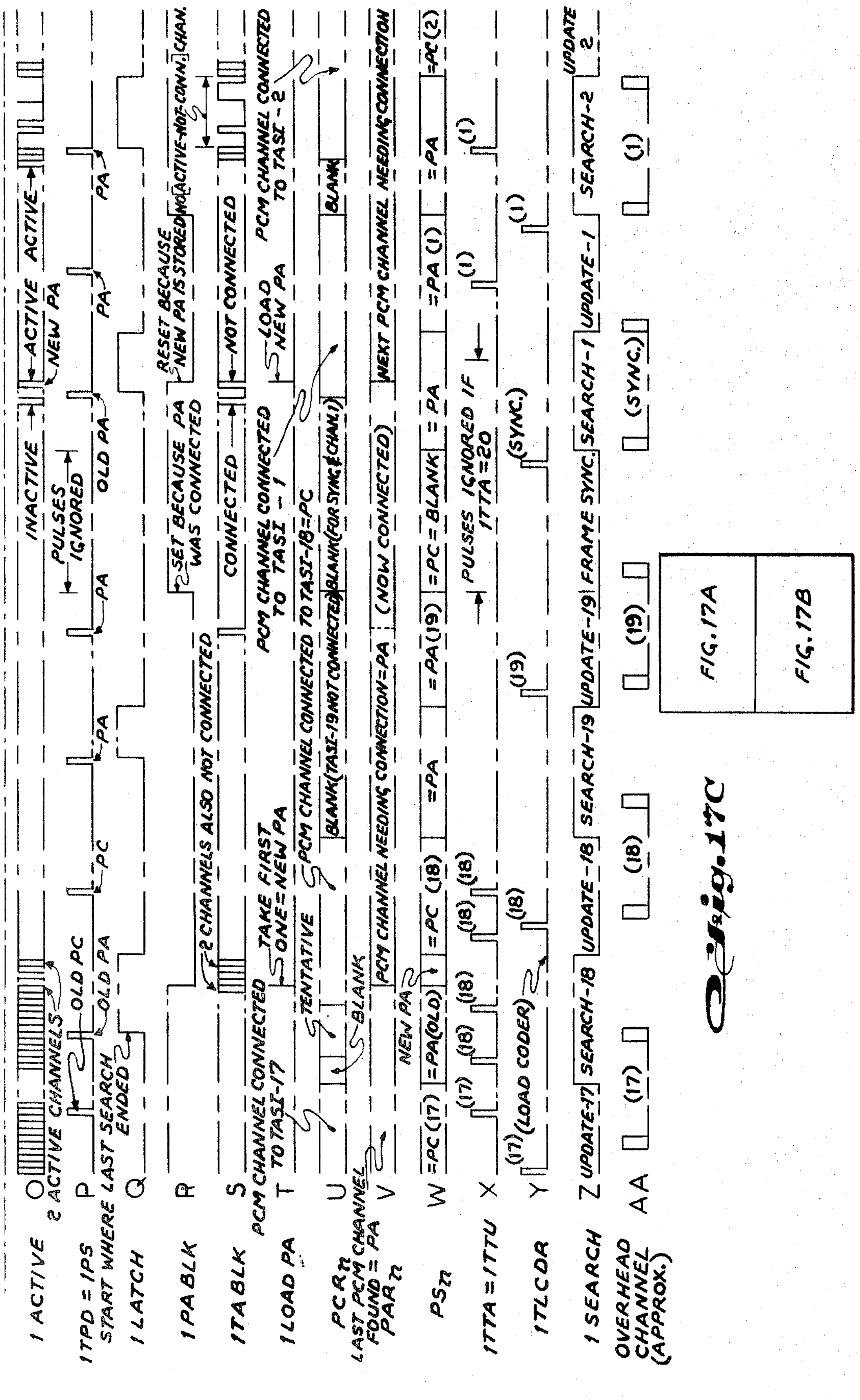
Figure 18:
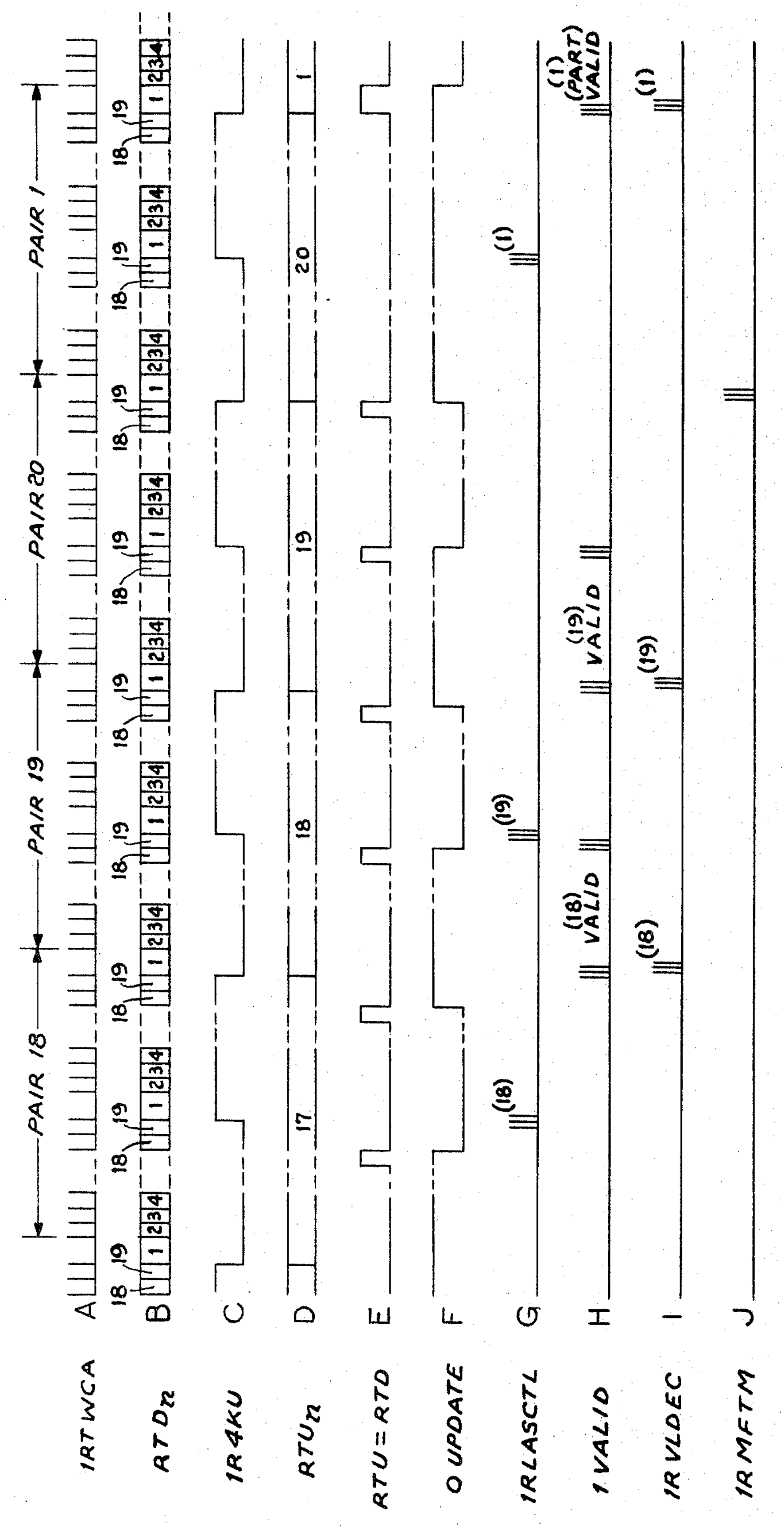
FIG. 18 is a typical timing diagram illustrating a typical operation of the TASI receive assignment control arrangement in accordance with the principles of the present invention.

Detailed timing diagrams for the operation of the transmit equipment are illustrated in FIGS. 9, 10, 11 and 12 while the detailed timing diagram for the operation of the receive equipment are illustrated in FIGS. 13, 14, 15 and 16. The timing that is particularly related to the operation of the transmit assignment control arrangement is illustrated in the timing diagrams of FIGS. 17A and 17B, when organized as illustrated in FIG. 17C, and the timing that is particularly related to the operation of the receive assignment control arrangement is illustrated in the timing diagram of FIG. 18.

The following will be a summary of some of the major mnemonics that are employed in various Figures of the present application and the timing counters employed in the generator 19 of the transmit equipment of FIG. 2 and the timing counters of generator 29 in the receive equipment of FIG. 3 associated therewith.

TPD (Transmit, PCM Data) Counter 33, FIG. 2 responds to Transmit PCM Word Clock (TPWC) and identifies the PCM channel number corresponding to each word in the PCM data format.

TTD (Transmit, TASI Data) Counter 34 responds to the Transmit TASI Word Clock A (TTWCA) and identifies the TASI channel number corresponding to each word in the TASI data format.

TTS (Transmit, TASI, Search phase) Counter 35 counts frame pairs and identifies the TASI channel number corresponding to each search cycle. (20 indicates sync cycle).

TTU (Transmit, TASI, Update phase) TASI channel holding register or counter 36 operates the same as counter 35 except that it lags TTS by one frame. It identifies the TASI channel number corresponding to each transmit update cycle.

RPD (Receive, PCM Data) Counter 37, FIG. 3 responds to the Receive PCM Word Clock (RPWC) and identifies the PCM channel number corresponding to each word in the PCM data format of the receive equipment.

RTD (Receive, TASI Data) Counter 38 responds to the Receive TASI Word Clock (RTWCA) and identifies the TASI channel number corresponding to each word in the TASI data format in the receive equipment.

RTU (Receive, TASI, Update phase) Counter 39 identifies the TASI channel number corresponding to each receive update cycle.

Prefix and suffix numbers are added to the above mnemonics to designate particular signals. For example, OTTU3 is a signal which is in logic state 0 whenever the third stage of counter 36 is a binary 1. The symbols 0 will be employed hereinafter to refer the zero logic state or binary condition and the symbol 1 will be employed hereinafter to refer to the one logic state or binary condition. In certain locations in the drawings and the specification to follow the notation $\overline{TTU3}$ is used and is equal to OTTU3. In addition TTU3 is employed in certain locations in the drawings and specification and will be equal to 1TTU3.

The following clock signals are employed and the mnemonics are as follows:

| | |
|---|---|
| T2304K | = Transmit 2304 KHz clock (PCM bit rate) |
| TPWC | = PCM Word Clock (Transmit) |
| TTWCA | = TASI Word Clock A (Transmit) |
| T4K | = Transmit 4KHz clock (frame pair rate) |
| R2304K | = Receive 2304 KHz clock (PCM bit rate) |
| RPWC | = PCM Word Clock (Receive) |
| RTWCA | = TASI Word Clock A (Receive) |
| R4KU | = Receive 4KHz clock (frame pair rate) |

It is important to note that since the status memory 10 and assignment memory 14 are read sequentially in phase with the PCM data format, the TPD counter 33 also provides the PCM channel number associated with each status word and assignment word that is being read, modified and/or written back into the associated memory in the transmit equipment of FIG. 2. Similarly, the RPD counter 37 provides the PCM channel number associated with each status word and assignment word that is being read, modified, and/or written back into the associated memory in the receive equipment of FIG. 3.

Figure 20:
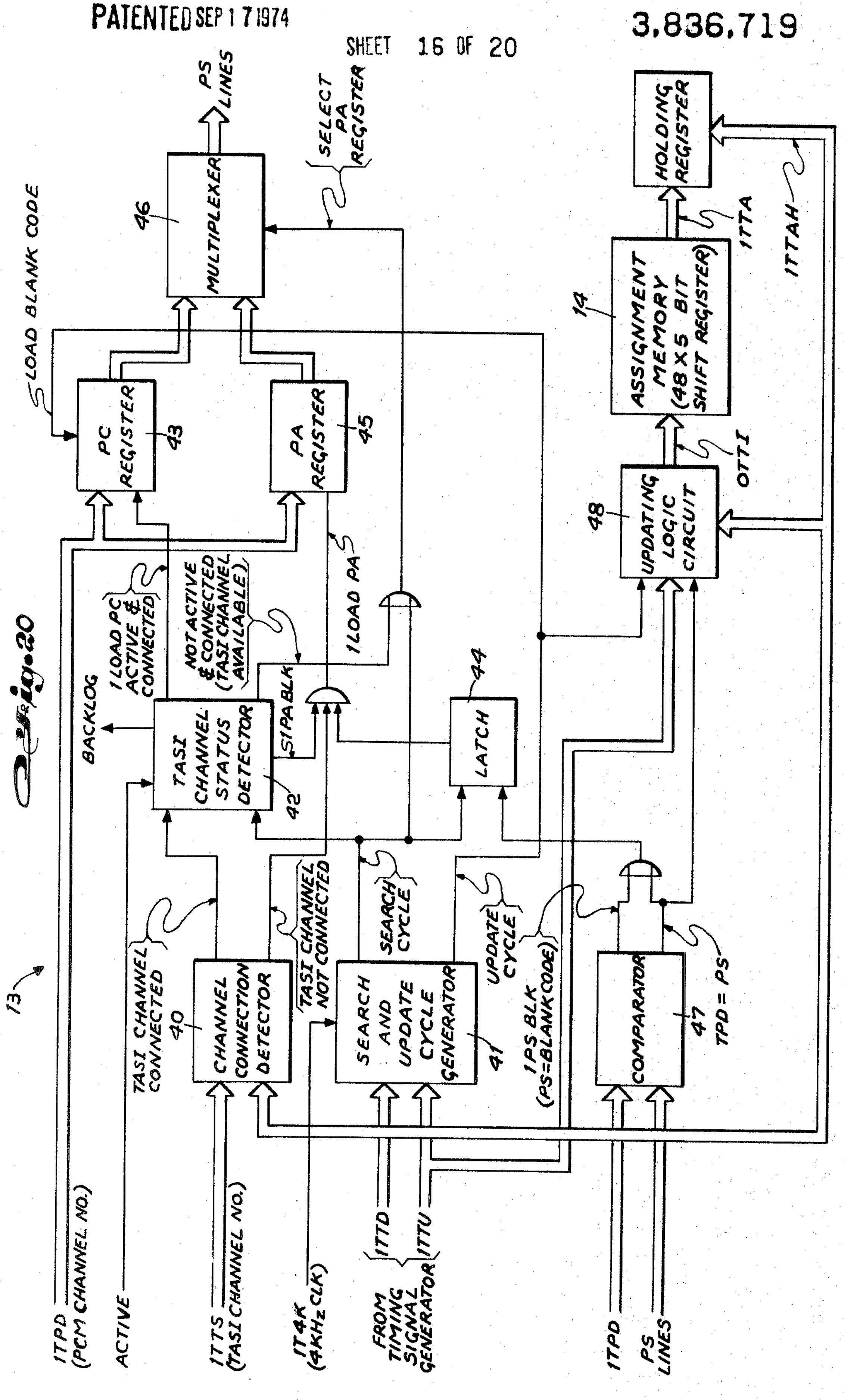
FIG. 20 is a block diagram of the transmit TASI assignment control arrangement in accordance with the principles of the present invention.

Referring to FIG. 20 there is illustrated therein a block diagram for the transmit assignment control arrangement including assignment memory 14 and assignment control circuit 13. The assignment control circuit 13 includes the channel connection detector 40 which compares the output TTAH of assignment memory 14 with the TASI channel number TTS corresponding to the search cycle. A match indicates that the TASI channel is connected. The TTD and TTU counters 34 and 36 of FIG. 2 have their outputs compared by the search and update cycle generator 41. When these match, the 4 KHz clock 1T4K is sampled to obtain the search and update cycle timing. The ACTIVE signal from activity simulator 11 of FIG. 2 indicates that the PCM channel identified by the PCM channel counter TPD (counter 33, FIG. 2) is active. The TASI channel status detector 42 determines if the TASI channel is available and if it is connected causes the channel number P*c* of the PCM channel to which it is connected to be loaded into the P*c* register 43. The latch 44 controls the starting and stopping of a search to find a PCM channel P*a* which is active but not connected. Latch 44 and other conditions cause the channel number P*a* to be loaded into the PA register 45. The multiplexer 46 determines the PCM channel numbers P*s* to be sent as part of a control word. The comparator 47 compares P*s* with the output of TPD counter 33 (FIG. 2) as a condition for operation of latch 44 and the update logic 48. Update logic 48 determines the input to assignment memory 14 (TTI). A connection is made by selecting *TTI* = *TTU.* A disconnect is made by selecting *TTI* = *blank.* The connection or disconnection is maintained by selecting *TTI* = *TTAH* (put back into memory 14 what was read from memory 14). The receive assignment control arrangement is similar to the transmit assignment control arrangement of FIG. 20, except that only the circuits required for the update cycle are provided, namely, a comparator similar to comparator 47 and update logic circuit 48.

The PCM channel numbers 1 through 48 are represented by the binary representation of numbers 0 through 63, skipping every fourth number (3, 7, 11, etc.). These binary numbers have 6 bits numbered 1 through 6 and have weights 32, 16, 8, 4, 2 and 1, respectively. The value of a binary number is obtained by summing the weights of all of the bits which are 1. Consider for example the binary number 001110. Bits 3, 4 and 5 are 1, and these have weights 8, 4 and 2. Therefore, the value of the binary number 001110 is 8 + 4 + 2 = 14 and thus the binary number 01110 is the binary representation of the analog number 14. The unused binary numbers are interpreted to indicate "blank." Bits 5 and 6 are both 1 for these numbers.

The TASI channel numbers 1 through 19 are represented by the binary representations of the numbers 0 through 18. These have 5 bits numbered 1 through 5 having weights 16, 8, 4, 2 and 1, respectively. Binary representations of numbers greater than 18 are all considered to indicate "blank." The TTS and TTU counters 35 and 36 of FIG. 2 and the RTU counter 39 of FIG. 3 also use the binary number 10011 to correspond to the sync word following the 19th control word.

In FIGS. 21 and 22 which are about to be discussed there is included therein blocks labeled with a number prefixed by the letters SN. These are model numbers of integrated circuit components that can be purchased from Texas Instruments, Inc. and are fully described in their handbook "Integrated Circuit Catalog for Design Engineers," First Edition. Other blocks have a number prefixed by the word "Fairchild". These are model numbers of the integrated circuit components that can be purchased from Fairchild Semiconductor and are fully described in their handbook "Fairchild Semiconductor TTL Data Book," June 1972. The other logic components of the logic diagrams of FIGS. 21 and 22 may be appropriately selected from the Texas Instruments Handbook or other similar handbooks of various manufacturers of integrated circuit components.

Figures 21C, 21D:
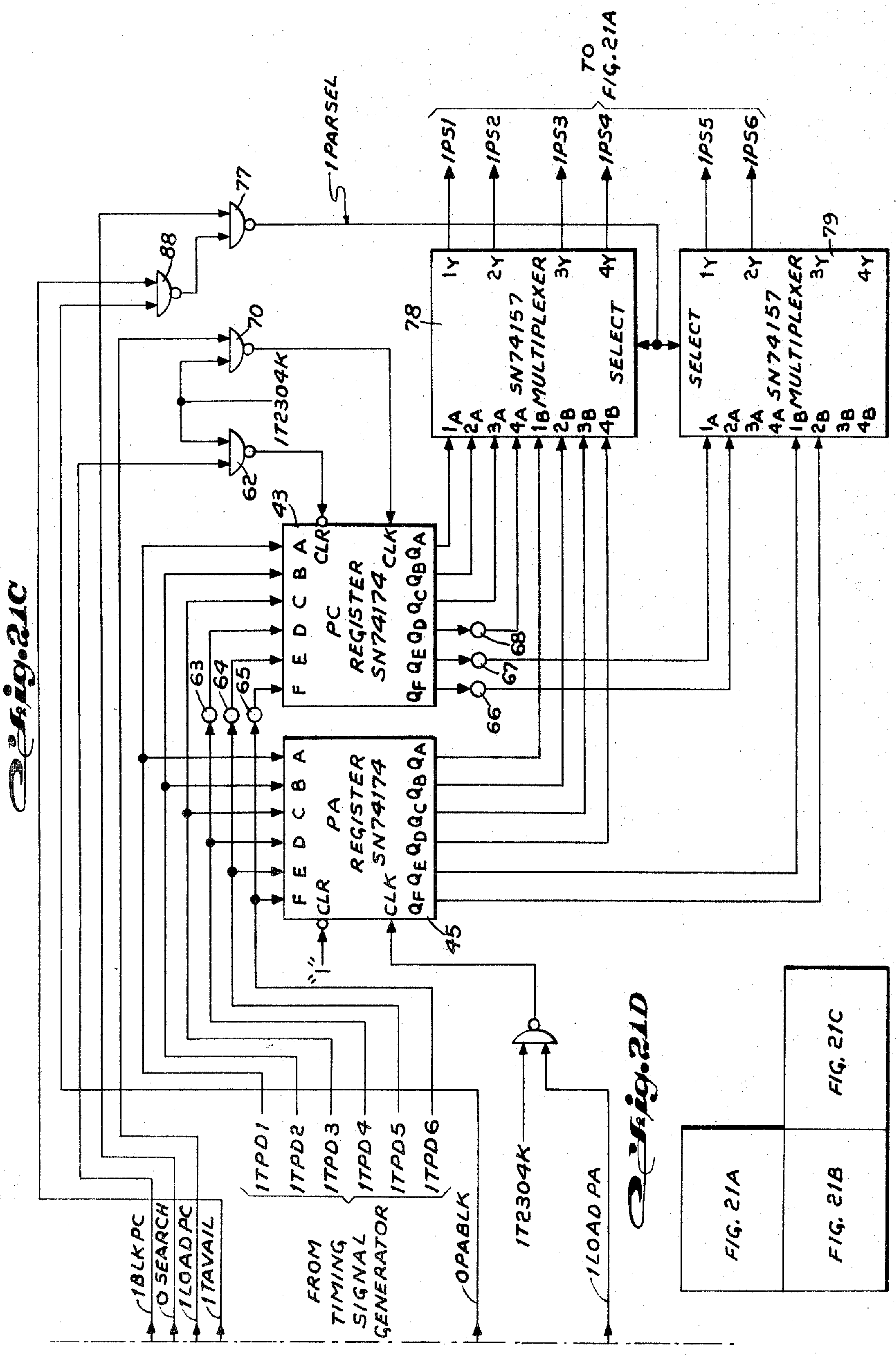
Figure 21B:
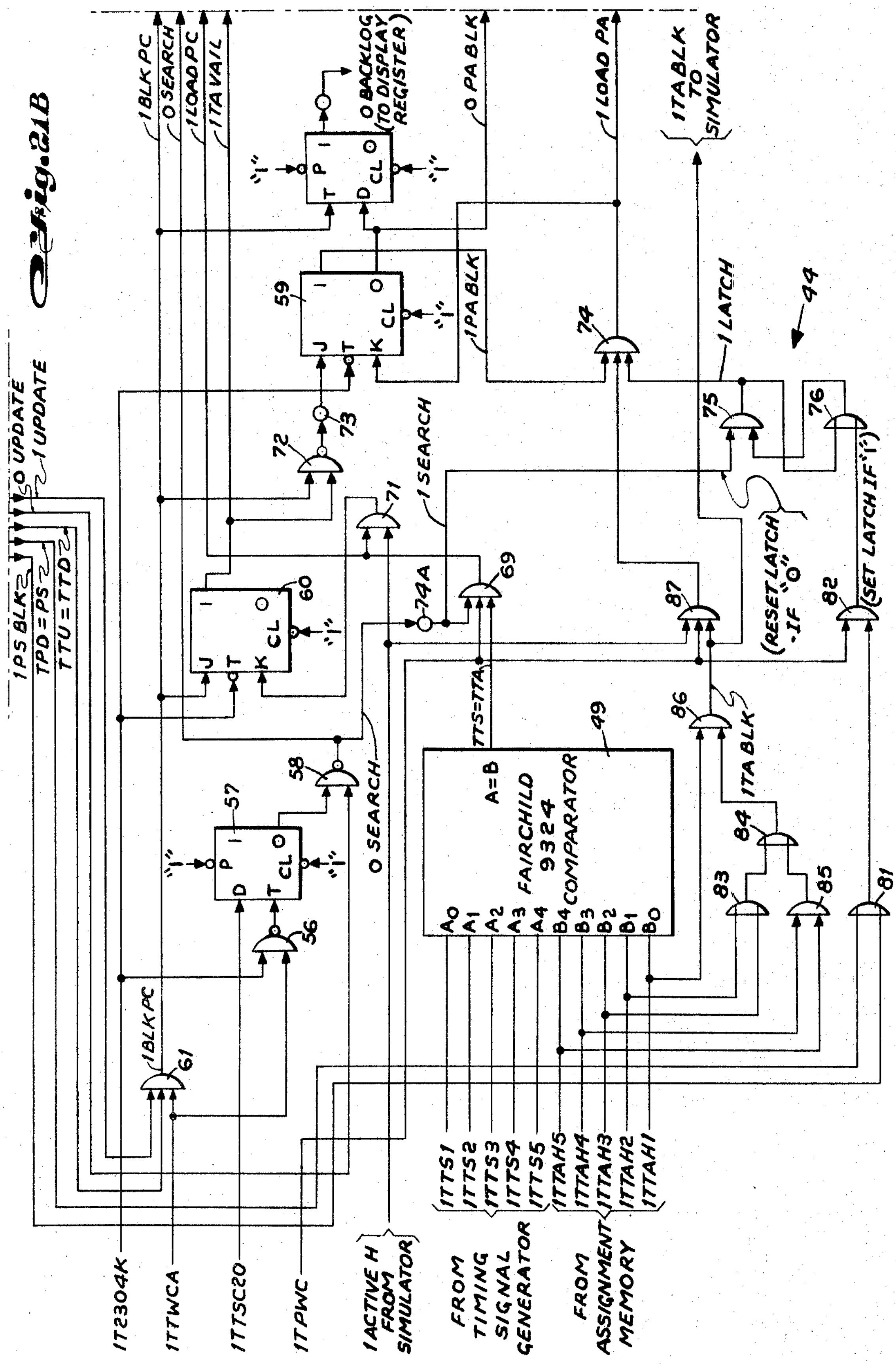

Reference is made to FIGS. 21A, 21B and 21C which, when organized as illustrated in FIG. 21D, illustrates the logic diagram of the transmit assignment control circuit 12, FIG. 2. This logic diagram includes a number of comparators such as comparator 49 (FIG.

21B) and comparators 50, 51, 52 and 53, in FIG. 21A. Comparators 52 and 53 form one 6-bit comparator. In such case, the name of the output signal, such as *TPD* = *PS* indicates the two channel numbers being compared, and the output signal indicates whether they are equal.

The signal *TTU* = *TTD* from comparator 50 indicates the end and beginning of the update cycle as indicated in Curve D, FIG. 8, because TTU identifies the TASI channel corresponding to the update cycle, and TTD will equal TTU whenever the time slot for the same TASI channel occurs. NAND gate 54 combines the output signal of comparator 50 with the appropriate word clock (1TTWCA), and the bit clock (1T2304K) and triggers the D-type flip flop 55 to sample the 4KHz timing signal 1T4K which is 1 and 0 on alternate frames. The 1UPDATE output of flip flop 55 is 1 during the update cycle only. The 0UPDATE is 1 during the sync cycle and search cycles only. The timing signal 1TTSC20 shown in FIG. 21B is 1 during count 20 of the TTS counter 35 (FIG. 2) and is sampled at the TASI word rate by clocks T2304K, TTWCA by NAND gate 56 and D-type flip flop 57 with the output signal of flip flop 57 indicating the timing of the sync cycle. NAND gate 58 combines the output of flip flop 57 with the 0UPDATE signal to produce a signal 0SEARCH = 0 during every search cycle.

One of the tasks of the search cycle is to find a P*c* channel Pc which is connected to the TASI channel for which the search is made. The PCM register 43 in FIG. 21C is provided to receive and hold the channel number P*c*. Before each search cycle begins, PC register 43 is reset to the blank code 000111, indicating that no connecting PCM channel is found as yet. During the search cycle, the TPD counter 33 (FIG. 2) identifies each of the PCM channels in sequence. For search cycle four, for example, the sequence of PCM channels is 9, 10, 11, 12 ... 47, 48, 1, 2 ... 7, 8. This results because search cycle four starts and ends at TASI channel 4, and TASI channel 4 comes between PCM channel 8 and 9, note Curves B and C of FIG. 4. If during a search, certain signals indicate that the TPD signal identifies a PCM channel that is connected to the TASI channel (identified by TTS), then the TPD count is loaded into PC register 43 because it satisfies the definition of P*c* presented herein. If more than one PCM channel number is loaded into PC register 43, the last one loaded will replace all the others, but it is desired to only want to "find at least one." If the TASI channel is not connected, no PCM channel number will be loaded, and at the end of the search cycle, the blank code will still be in PC register 43, indicating no connection. The details of these operations will be discussed later.

Similarly, PA register 45 (FIG. 21C) is provided to receive and hold P*a*, the number of a PCM channel that is active but not connected. When the signal TPD identifies such a channel, it is loaded into the PA register 45. As before, an indication of whether loading occurred during the search cycle must be provided. However, instead of indicating this by a blank code in register 45, it is indicated by setting the JK type flip flop 59 which produces an output signal 1PABLK. The reason for this is that it is necessary to save the P*a* channel number from one search cycle to the next. A blank code would replace the channel number P*a* in register 45.

To provide good voice quality on all voice signals, the assignment control should give all channels equal service. For example, if the search for channel P*a* were to always start at channel number 1, the lower numbered channels would always be "first in line" and would be connected more quickly. If the channels are not only scanned in sequence, but the scan (search) is always continued from the last channel that was found (no skipping, and no backward motion), then all PCM channels have an equal opportunity for obtaining a connection to a TASI channel. This avoids situations where a channel might "go to the end of the waiting line" several times before reaching the "front of the line." The technique described here is less expensive than storing a waiting line of channel numbers in a "push-down register stack" or "queue memory," but achieves nearly the same results. This is achieved by modifying the timing of the search for P*a* (but not the search for P*c* and TASI-available) in a simple manner as follows. The search is stopped as soon as a P *a* channel number is found (if none is found, stop at the end of the search cycle) and start the next search after the next search cycle begins and when the TPD counter 33, (FIG. 2) gets to the PCM channel P*a* which was last found. This is the reason that channel P*a* is saved until the next search cycle.

The third (and last) item to be found during the search cycle is whether the TASI channel TTS is available (not connected or connected to an inactive PCM channel). At the end of the search cycle (at least, or before the end) it is desired that the JK flip flop 60 which is set to 1 if channel TTS is available, or reset to 0 if not available. After the end of the search cycle, P*s* (the PCM channel number sent to the receive equipment) can be determined from the information in registers 43 and 44 and flip flops 59 and 60.

During the last word period of the update cycle, TTU and TTD, counters 36 and 34, (FIG. 2), respectively, are equal. AND gate 61 (FIG. 21B) uses these conditions to generate the timing signal 1BLKPC at the end of the update cycle. The 1BLKPC pulse starts the following search cycle by setting PC register 43 via NAND gate 62 to the blank code 000111. Actually, the clear (CLR) input of register 43 employing the type 74174 integrated circuit was designed to set the register to 000000. To achieve the blank code 000111 instead, bits 4, 5 and 6 are inverted by NOT gates 63, 64 and 65 going into register 43 and by NOT gates 66, 67 and 68 coming out of register 43. This means that bit positions 4, 5 and 6 of register 43 store inverted bits 4, 5 and 6. That is, "zeros" in these bit positions actually represent 1 bits and vice versa.

The 1BLKPC signal is also used by flip flop 60 before beginning each of the search cycles. This represents an initial assumption that the TASI channel is available. If, during the search cycle, evidence is found showing that the TASI channel is not available, flip flop 60 will be reset. Code TTAH into comparator 49 is the output of assignment memory 14. If the TASI channel TTS is connected to some PCM channel P*c*, then the channel number equal to TTS is stored in location P*c* of assignment memory 14 to indicate this. As the assignment words (TASI channel number) are read from assignment memory 14, counter 33 (FIG. 2) provides the address (or "location") of these words. Therefore, when *TPD* = *Pc*, the TTAH read from assignment memory 14 will equal TTS if TASI channel TTS is connected to PCM channel TPD. The signal $\overline{TTS=TTA}$ at the output of comparator 49 is gated by AND gate 69 with search timing signal 1SEARCh and word clock 1TPWC to produce a pulse in signal 1LOADPC when this occurs. The 1LOADPC pulse is used to load the word TPD into PC register 43 via NAND gate 70. If channel TPD (= *Pc*) is active, the signal 1ACTIVEH will be 1 at this time and the 1LOADPC pulse will pass through AND gate 71 and reset flip flop 60. The condition that TASI channel TTS is connected to an active PCM channel indicates that the initial assumption that the TASI channel available was not true, and is the reason for resetting flip flop 60.

The purpose of flip flop 59 is to indicate whether the PCM channel number in PA register 45 is the number of an active unconnected PCM channel. Only such channel numbers are put into PA register 45, but afterward, the corresponding PCM channel is connected to an available TASI channel. Therefore, even though the channel number in PA register 45 has not changed, the "active, unconnected" condition is no longer true because the connection status of the corresponding channel has changed. Flip flop 59 is reset by the 1LOADPA pulse when PA register 45 is loaded with the number of an active and unconnected channel. Flip flop 59 remains reset until an available TASI channel is found, that is, when the signal $TAVAIL$ = 1. In the update cycle after the available TASI channel is found, the channel P*a* will be connected. At the end of this update cycle, the 1BLKPC pulse will be allowed to pass through NAND gate 72 and NOT gate 73 to set flip flop 59, because the signal $TAVAIL = 1$ into NAND gate 72. Previously, while PCM channel P*a* was waiting for an available TASI channel, flip flop 59 was reset, and the signal 1PABLK = 0 into AND gate 74 prevents loading the number of another active, unconnected PCM channel (new P*a*) into PA register 45 until the present channel P*a* gets connected.

The generation of the 1LOADPA pulse used to load PA register 45 will next be described.

During the update and sync cycles, the signal 1SEARCH from NOT gate 74A is 0. This resets latch 44 which includes AND gate 75 and OR gate 76. When latch 44 is reset the signal 1LATCH = 0, and inhibits the 1LOADPA signal from gate 74.

During every search cycle, the signal 0SEARCH = 0. This condition at the input of NAND gate 77 makes the signal 1PARSEL (PA Register SELect) = 1. This input to multiplexers 78 and 78 forming the multiplexer 46 of FIG. 20 causes the multiplexer to select PA register 45. That is, the outputs of PA register 45 are routed through the multiplexer to provide the PS signals. Thus, $Ps = Pa$ during every search cycle. Comparators 52 and 53 compares the PS and TPD channel numbers. During the search cycle, the output signal $TPD = PS$ can be interpreted to indicate whether $TPD = PA$. The AND gate 80 produces the output 1PSBLK whenever bits 5 and 6 of the numbers PS are both 1. This indicates that the PS code is a "blank" code (one of the codes not used to represent a channel number). Similarly, during the search cycle this signal can be interpreted to indicate that a blank code is in PA register 45. As previously explained, the blank codes are not loaded into PA register 45. However, a blank code may appear in PA register 45 when the power is first turned on.

When TPD counter 33, (FIG. 2) counts to the same channel number P*a*, it is time to start the search for another channel P*a* if other conditions are also met. This is indicated by the signal $TPD = PS$ at the input to OR gate 81 being equal to 1. If there is a blank code in PA register 45, the condition $TPD = PA$ will never occur (TPD is never blank) and the search for a new PA will never start unless the $TPD = PS$ signal is ignored. Therefore, gate 81 produces 1 either if signal $TPD = PS$ is 1 or if 1PSBLK is 1, indicating in the search cycle that either TPD = PA or that PA is blank. A 1 form 81 enables a PCM word clock TPWC pulse to pass through AND gate 82 to set latch 44. However, the reset input to latch 44 has priority over the set input thereto, so that latch 44 can be set only after the search cycle has begun.

If the PCM channel indicated by TPD is unconnected, the assignment word TTAH read from assignment memory 14 at this time will be a blank. OR gates 83 and 84 and AND gates 85 and 86 examine the assignment word to detect blank codes. The output of this detector, signal 1TABLK, is 1 if TTAH is blank, that is, if channel TPD is not connected. If the signals 1ACTIVEH and 1TABLK, the inputs to AND gate 87 are both 1, this indicates that channel TPD is active and not connected (the requirement for P*a*) and the word clock pulse 1TPWC is enabled to pass through gate 87. If 1PABLK = 1, an input to gate 74, indicating that the old channel P*a* identified by PA register 45 has been connected and that the assignment control is allowed to find a new channel P*a*, and if 1LATCH = 1, another input to gate 74, then the pulse from gate 87 is enabled to pass also through gate 74, producing the 1LOADPA pulse. This pulse indicates that TPD is the new P*a* channel number, and causes this new channel number to be loaded into the PA register 45. At the same time, the 1LOADPA pulse resets flip flop 59 and 1PABLK signal to gate 74 disables this gate, ending at P*a* search.

At the end of the search cycle, the state of the assignment control is as follows. PC register 43 either stores the number Pc of a PCM channel connected to TASI channel TTS, or stores a blank code, indicating that channel TTS is not connected. If flip flop 60 is set, channel TTS is available, that is either channel TTS is not connected or channel Pc is inactive. If flip flop 60 is reset, channel TTS is connected to an active channel P*c*. If flip flop 59 is set, the channel number P*a* in the PA register 45 is no longer needed for the update cycle, although it may be desired to still save this number so that the next search for a new P*a* can start at this channel. If flip flop 59 is set, channel P*a* was found in a search cycle preceding the most recent search cycle and has been connected to an available TASI channel during the last update cycle, or earlier. Since then, a new P*a* has not been found to take its place. If, however, flip flop 59 is reset, the channel number P*a* in the PA register 45 is an active, unconnected PCM channel that is waiting to be connected.

During the update cycle, signal 0SEARCH, an input to gate 77, is 1, and multiplexers 78 and 79 selects PA register 45 only if 0PABLK and 1TAVAIL, inputs to NAND gate 88, are both 1. That is, PA register 45 is selected only if flip flop 59 is reset and flip flop 60 is set, indicating that a PCM channel P*a* needs a connection and the TASI channel is available. In this case, the TASI channel should be disconnected from channel Pc (if Pc is not blank) and connected to channel P*a* during the update cycle. Since the multiplexers 78 and 79 selects *Ps* = *Pa*, P*s* is the PCM channel to which the TASI channel will be connected.

If, during the update cycle, signals 0PABLK and 1TAVAIL are not both 1, a new connection cannot be established, either because there is no new PCM, channel P*a* needing a connection (0PABLK = 0) or because the TASI channel is not available (1TAVAIL = 0), or both. In this case, multiplexers 78 and 79 selects *Ps* = *Pc*, which is the PCM channel to which the TASI channel will be connected. If the TASI channel was connected to one PCM channel, *Ps* = *Pc* = the number of this channel, and the TASI channel will again be connected to the same PCM channel. If the TASI channel was connected to more than one PCM channel, *Ps* = *Pc* = the number of one of these channels, and the TASI channel will continue to be connected to this PCM channel, but will be disconnected from the others. If the TASI channel was not connected, then *Ps* = *Pc* = blank and the TASI channel will remain disconnected.

Therefore, in all cases, P*s* is the PCM channel to which the TASI channel will be connected, whether this is a new connection or a continuation of an old connection, and the TASI channel will be disconnected from all other channels. *Ps* = blank, however, is interpreted to represent no connection.

Before describing the updating logic, it should be pointed out that TTS counter 35 (FIG. 2) is advanced sometime during the update (or sync) cycle and the TTU counter or hold register 36 (FIG. 2) is advanced sometime during a search or "sync" cycle. "During" here includes the beginning and end of a cycle. In this manner, if the search and update cycles are considered associated with "the" TASI channel T (T being any integer from 1 to 19), then *TTS* = *T* during the entire search cycle T and *TTU* = *T* during the entire update cycle T. Therefore, even though the assignment logic uses TTS counter 35 during the search cycle and the TTU counter 36 during the following update cycle, it is the same TASI channel number. This is illustrated in Curves C, E, H and Z of FIGS. 17A and 17B.

The updating of assignment memory 14 is mainly done by multiplexer 100 of FIG. 21A. This multiplexer has the assignment memory output TTAH and the TASI channel counter TTU as inputs, and its output TTI is the input to assignment memory 14. Multiplexer 100 can also generate a blank code by making bits 1 and 2 both 1. No matter what bits 3, 4 and 5 are, the binary representation of a number equal to 24 or greater is generated. This is a blank TASI channel number. A blank PCM channel number has bits 5 and 6 both 1. Update multiplexer 100 is controlled by signals C1 and C2, from which signal C3 is also generated. TABLE I below indicates how the selection of the output TTI depends on signals C1 and C2.

TABLE I

| TTI OUTPUT | C1 | C2 | C3 |
|---|---|---|---|
| TTAH | 0 | 0 | 0 |
| BLANK = 11XXX | 0 | 1 | 1 |
| TTU | 1 | 0 | 0 |
| TTU | 1 | 1 | 0 |
| | TPD=PS | TTA=TTU | TTA=TTU TTD ≠ PS |

During the search cycle, the signal 1UPDATE = 0, and this signal input to AND gates 89 and 90 makes signals C1 and C2 both = 0, which selects *TTI* = *TTAH*. In this case, the assignment words read out of memory 14 are written back into memory 14 with no change. During the update cycle, 1UPDATE = 1 and this input to gates 89 and 90 makes C1 the same as signal *TPD* = *PS* and signal C2 the same as signal *TTA* = *TTU*. Each of these signals is 1 when the statement of equality for which the signal is named is true.

TPD channel counter 33 (FIG. 2) identifies each of the PCM channels in sequence during the update cycle as was described for the search cycle. During this cycle, it is desired to connect TASI channel TTU to PCM channel PS and disconnect channel TTU from all other channels, except that if PS is blank channel TTU will disconnect for all PCM channels. Recall that an assignment word (TTAH out of memory 14, or TTI into memory 14) stored at address TPD in the assignment memory 14 indicates a connection of PCM channel TPD to TASI channel TTAH or TTI.

If TPD is equal to PS during the update cycle, signal C1 will be 1, and *TTI* = *TTU* will be selected. This appears when the TPD counter 33 gets to channel number PS during the update cycle. Channel number TTU will be stored in address TPD of assignment memory 14 indicating a connection between TASI channel TTU and PCM channel TPD. This cannot occur if PS is blank because TPD is never blank. Therefore, if PS is blank, channel TTU is not connected.

If, during the update cycle, TPD is not equal to PS and TTAH is equal to TTU, the signal *C1* = 0, signal *C2* = 1 and signal *C3* = 1, and *TTI* = blank is selected. In this case, the channel number TTAH read from the address TPD of assignment memory 14 indicates that TASI channel TTAH is connected to PCM channel TPD. But since *TTAH* = *TTU*, the TASI channel TTU is connected to a PCM channel TPD which is not the PCM channel PS (because TPD does not equal P*s*) to which channel TTU should be connected. When it was stated earlier "disconnect channel TTU from all other channels" it was meant from all channels that are not channel PS. Therefore, channel TPD is disconnected by storing a blank code (*TTI* = blank) at address TPD of is disconnected by storing a blank code (*TTI* = blank) at address TPD of assignment memory 14.

The only other possible combination of signals C1 and C2 occurs when TPD is not equal to PS and TTAH is not equal to TTU. This indicates that a PCM channel TPD is either connected to a TASI channel TTAH or is unconnected if TTAH is a blank. But the update cycle is only concerned with connecting channel TTU to channel PS, not with any other (indicated by the inequality) channels. Therefore, TTAH represents some other connection status which there is no reason to change. By selecting *TTI* = *TTAH*, the same assignment word is returned to assignment memory 14.

Figures 22B, 22C:
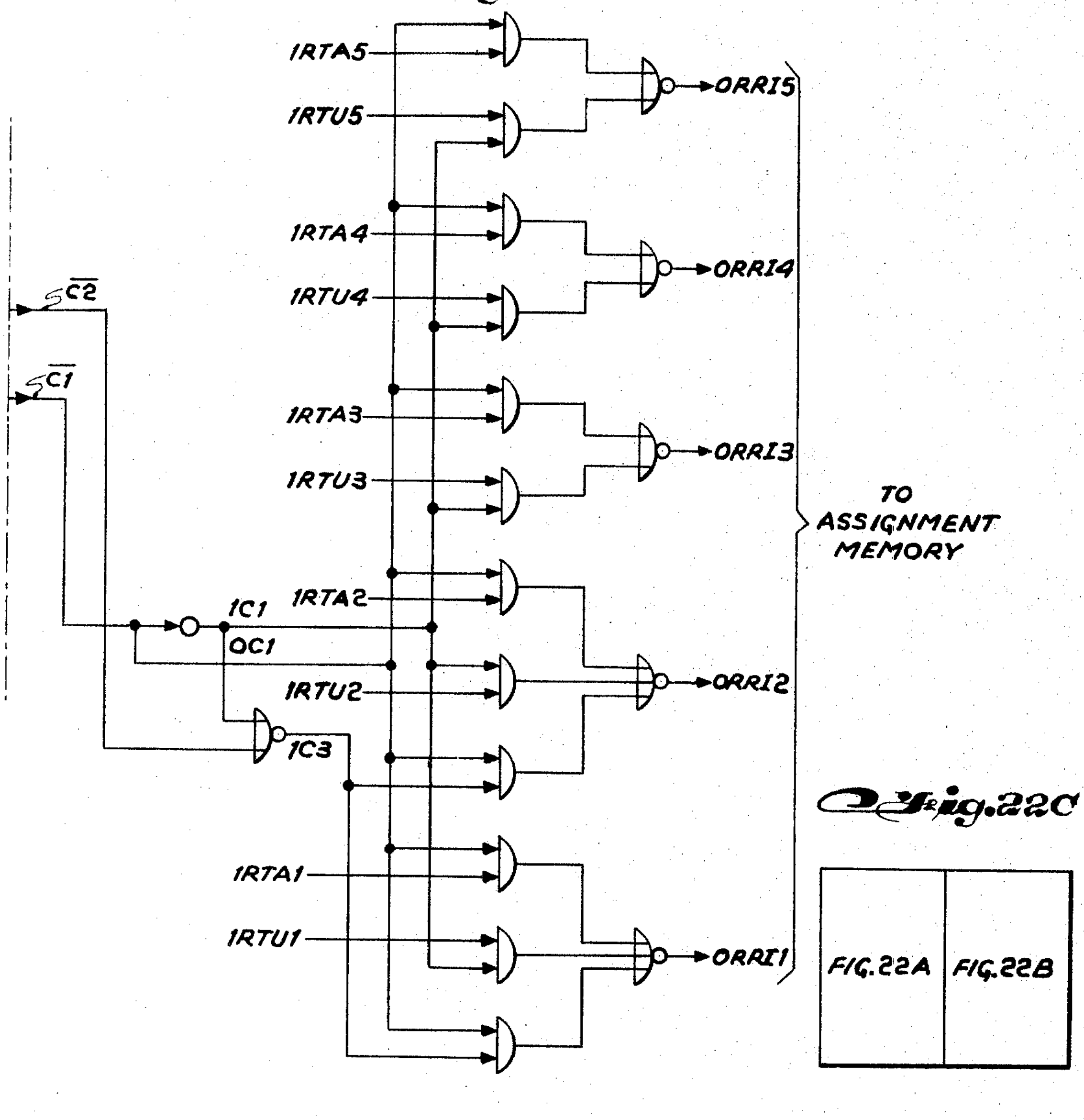
FIGS. 22A and 22B, when organized as illustrated in FIG. 22C, illustrates the receive equipment assignment control arrangement in accordance with the principles of the present invention.
Figure 19:
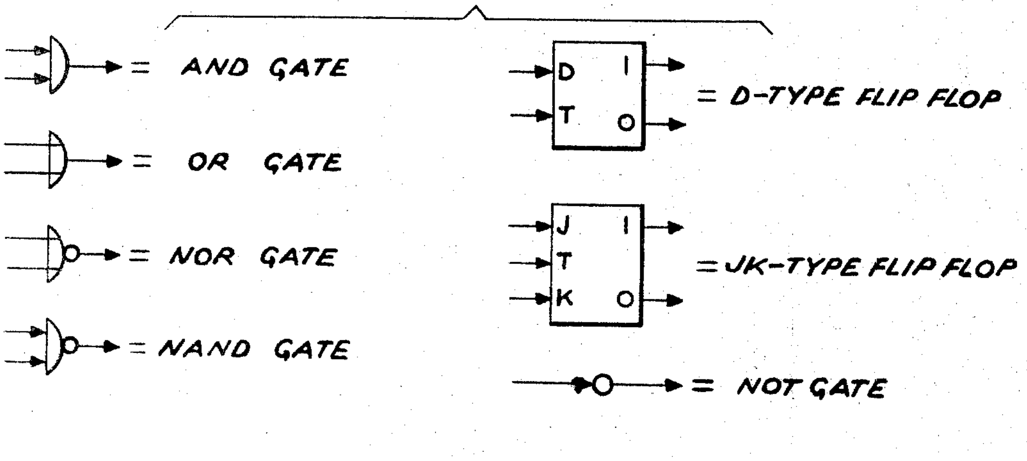
FIG. 19 defines the logic symbols employed in FIGS. 20–22.
Figure 22A:
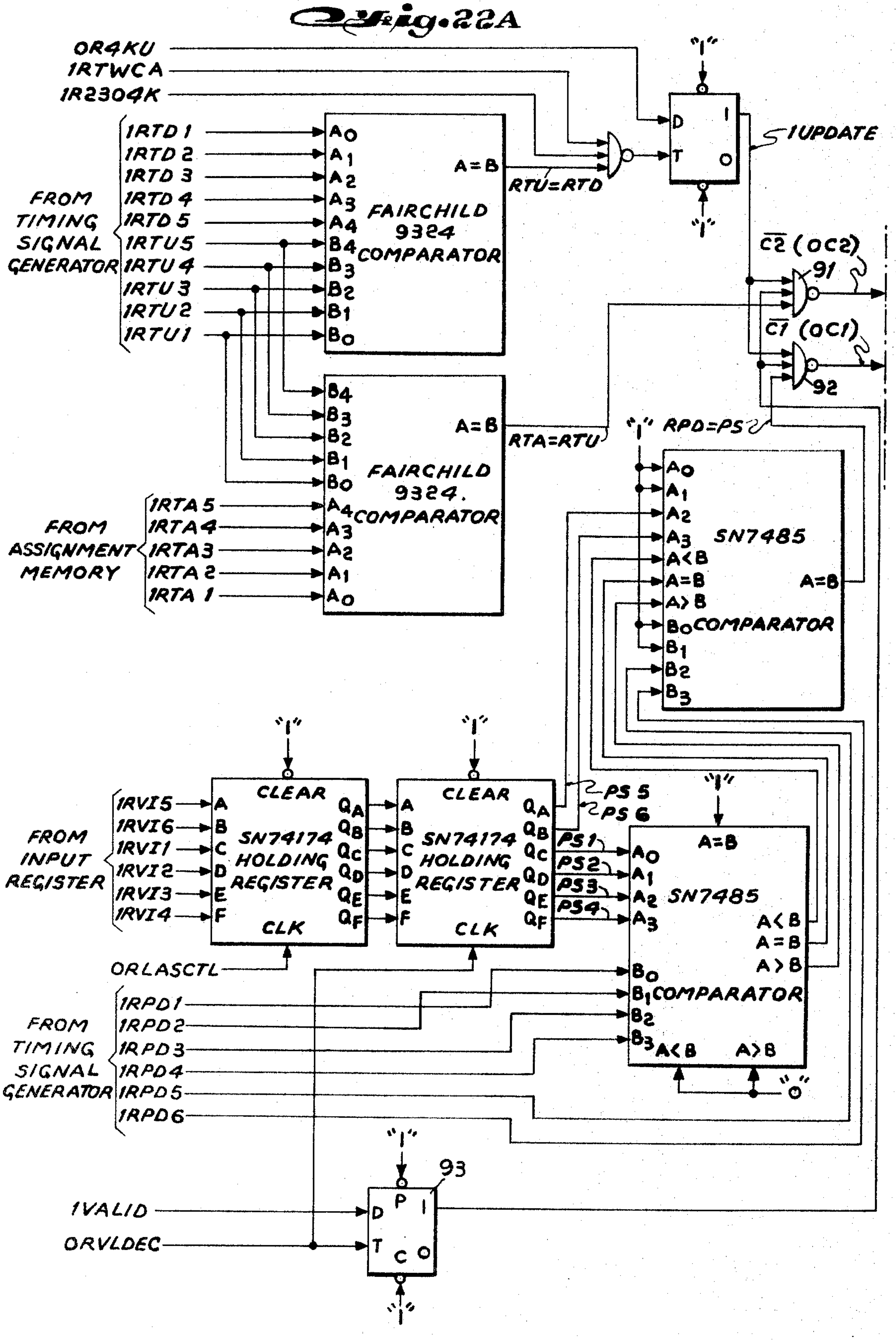

Referring to FIGS. 22A and 22B, as organized according to FIG. 22C, it is disclosed therein the assignment control arrangement in the receive equipment that is similar to update logic circuitry of FIG. 21A. The logic diagram of FIG. 22A and 22B will operate as described hereinabove for FIG. 21A. In the update logic for the receive assignment control arrangement, the PS code is obtained from the control word received from the transmit equipment via the data transmission system. This is the same PS code generated by the search logic of the transmit assignment control arrangement and used by the transmit update logic. The output of assignment memory 24 (FIG. 3) is RTA and the input to assignment memory 24 is RRI. The only significant difference between the transmit and receive update logic of the transmit and receive assignment control arrangement is the signal 1VALID received from control code check 30 (FIG. 3). Control code checker 30 checks the information (PS) bits and parity bits of each control word. If these do not agree according to the parity code, it is concluded that the control word was received in error and the 1VALID signal is 0. This signal as applied to NAND gates 91 and 92 via D-type flip flop 93 and the outputs therefrom are both 1. That is, signal $\overline{C1} = \overline{C2} = 1$. This selects $RRI = RTA$ and prevents any updating operation. Thus, erroneous control words are ignored. However, since the same control (assignment) information is transmitted repeatedly (once per multiframe), good information is eventually received and errors in transmission cause the updating of the receive equipment to be delayed rather than to be made incorrectly. TABLE II below illustrates the conditions of signals C1, C2 and C3 for producing the RRI output.

TABLE II

| RRI OUTPUT | C1 | C2 | C3 |
|---|---|---|---|
| RTA | 0 | 0 | 0 |
| BLANK = 11XXX | 0 | 1 | 1 |
| RTU | 1 | 0 | 0 |
| RTU | 1 | 1 | 0 |
| | RPD = PS | RTA = RTU | RTA = RTU RPD ≠ PS |

While I have described above the principles of my invention in connection with specfic apparatus it is to be clearly understood that this description is made only by way of example and not as a limitation to the scope of my invention as set forth in the objects thereof and in the accompanying claims.

I claim:

1. In a TASI communication system having P input pulse code modulated speech channels to a transmitter of said system and P output pulse code modulated speech channels from a receiver of said system and T pulse code modulated channels for T of said P channels propagated between said transmitter and said receiver, where P is an integer greater than one and T is an integer greater than one but less than P, said P input and output channels being organized to form a first time division multiplex frame format, said T channels and a portion of a control word being organized to form a second time division multiplex frame format and 2(T + 1) of said second format being organized to form a multiframe, a first assignment control arrangement for said transmitter comprising:

first means to produce timing signals including at least a first transmit timing signal identifying the number of said P channels in sequence in said first format, a second transmit timing signal identifying the number of said T channels in sequence in said second format, a third transmit timing signal identifying the number of said T channels in sequence during each search cycle and a fourth transmit timing signal identifying the number of said T channels in sequence during each update cycle at said transmitter;

second means to store in sequence code words identifying the previous assignment of each of said P channels;

third means coupled to said first and second means responsive to said first, second, third and fourth transmit timing signals and said code words at the output of said second means to determine the connection and activity status of each of said P channels and to produce code words identifying the assignment of previously connected ones of active ones of said P channels to particular ones of said T channels that are still connected and active and to identify new assignments to enable newly active ones of said P channels to be connected to available ones of said T channels;

fourth means coupled to said third means, said first means and said second means responsive to at least said code words at the output of said second means, said first and fourth transmit timing signals to return said code words to said second means identifying the assignment of previous connections that are still active and connected and to update said code words stored in said second means for said new assignments; and fifth means coupled to said third means to transmit said code words in the appropriate portion of said multiframe to said receiver; and a second assignment control arrangement for said receiver comprising:

sixth means to produce timing signals including a first receive timing signal identifying the number of said P channels in sequence in said first format, a second receive timing signal identifying the number of said T channels in sequence in said second format, and a third receive timing signal identifying the number of said T channels in sequence during each update cycle at said receiver;

seventh means to store in sequence code words identifying the previous assignment of each of said P channels; and eighth means coupled to said fifth means, said sixth means and said seventh means responsive to said transmitted code words, said first, second and third receive timing signals and said code words at the output of said seventh means to return said code words to said seventh means identifying the assignment of previous connections that are still active and connected and to update said code words stored in said seventh means for said new assignments.

2. A communication system according to claim 1, wherein each of said second format includes one half of said control words, the first [2(T + 1)–2] of said second format in said multiframe includes a different one of said transmitted code words for each of the first *T* of said control words, and the last two of said second format in said multiframe includes a sync code word as the last of said control words.

3. A communication system according to claim 2, wherein said third means includes a *T* channel connection detector coupled to said first means and said second means responsive to said third transmit timing signal and said code words at the output of said second means to produce one of a $T$ channel connected signal and a $T$ channel not connected signal, a search and update cycle generator coupled to said first means responsive to said second transmit timing signal and said fourth transmit timing signal to produce a search cycle signal and an update cycle signal, a $T$ channel status detector coupled to said connection detector and said generator responsive to said $T$ channel connected signal and said search cycle signal to produce one of an active and connected signal, a not active and connected signal and a blank signal, a latch connected to said fourth means and said generator responsive to a predetermined signal from said fourth means and said search cycle signal to produce a first predetermined output signal, a first logic circuit coupled to said connection detector, said latch and said status detector responsive to said blank signal, said first predetermined output signal and said channel not connected signal to produce a second predetermined output signal, a second logic circuit coupled to said status detector and said generator responsive to said not active and connected signal and said search cycle signal to produce a third predetermined output signal, a first register coupled to said first means, said status detector and said generator responsive to said first transmit timing signal, said active connected signal and said update cycle signal to load said first transmit timing signal into said first register during a first condition of said active connected signal and said update cycle signal and to load a code representing an inactive channel in said first register during a second condition of said active connected signal and said update cycle signal, a second register coupled to said first means and said first logic circuit responsive to said first transmit timing signal and said second predetermined output signal to load said first transmit timing signal into said second register upon said second predetermined output signal achieving a given condition, and a multiplexer coupled to said first and second registers and said second logic circuit to provide said code words equal to the contents of said first register during a first condition of said third predetermined output signal and equal to the contents of said second register during a second condition of said third predetermined output signal.

4. A communication system according to claim 3, further including an activity simulator providing an active signal, and wherein said status detector is coupled to said activity simulator for response to said active signal.

5. A communication system according to claim 4, wherein said fourth means includes a comparator coupled to said multiplexer and said first means responsive to said code words and said first transmit timing signal to produce a first output signal identifying said code words as being blank code words and a second output signal indicating that said code words equal said first transmit timing signals, one of said first and second output signals being connected to said latch, and a first updating logic circuit coupled to said first means, said generator, said second means and said comparator responsive to said fourth transmit timing signal, said update cycle signal, said code words stored in said second means and said second output signal to return said code words to said second means identifying the assignment of previous connections that are still active and connected and to update said code words stored in said second means for said new assignments.

6. A communication system according to claim 5, wherein said eighth means includes a comparator arrangement coupled to said fifth means and said sixth means responsive to said transmitted code words and said first receive timing signal to produce a third output signal indicating that said transmitted code words equal said first receive timing signals, and a second updating logic circuit coupled to said sixth means, said seventh means and said comparator arrangement responsive to said second receive timing signal, said third receive timing signal, said third output signal and said code words stored in said seventh means to return said code words to said seventh means identifying the assignment of previous connections that are still active and connected and to update said code words stored in said seventh means for said new assignments.

7. A communication system according to claim 6, further including a code checker to check said transmitted code words for accuracy and to produce a valid signal when said transmitted code words are accurate; and wherein said second updating logic circuit is coupled to said code checker for response to said valid signal.

8. A communication system according to claim 3, wherein said fourth means includes a comparator coupled to said multiplexer and said first means responsive to said code words and said first transmit timing signal to produce a first output signal identifying said code words as being blank code words and a second output signal indicating that said code words equal said first transmit timing signals, one of said first and second output signals being connected to said latch, and a first updating logic circuit coupled to said first means, said third means, said comparator and said second means responsive to said fourth transmit timing signal, an update cycle signal, said second output signal and said code words stored in said second means to return said code words to said second means identifying the assignment of previous connections that are still active and connected and to update said code words stored in said second means for said new assignments.

9. A communication system according to claim 8, wherein said eighth means includes a comparator arrangement coupled to said fifth means and said sixth means responsive to said transmitted code words and said first receive timing signal to produce a third output signal indicating that said transmitted code words equal said first receive timing signals, and a second updating logic circuit coupled to said sixth means, said seventh means and said comparator arrangement responsive to said second receive timing signal, said third receive timing signal, said third output signal and said code words stored in said seventh means to return said code words to said seventh means identifying the assignment of previous connections that are still active and connected and to update said code words stored in said seventh means for said new assignments.

10. A communication system according to claim 9, further including a code checker to check said transmitted code words for accuracy and to produce a valid signal when said transmitted code words are accurate; and wherein said second updating logic circuit is coupled to said code checker for response to said valid signal.

11. A communication system according to claim 2, wherein said fourth means includes a comparator coupled to said third means and said first means responsive to said code words and said first transmit timing signal to produce a first output signal identifying said code words as being blank code words and a second output signal indicating that said code words equal said first transmit timing signals, and an updating logic circuit coupled to said first means, said third means and said comparator responsive to said fourth transmit timing signal, an update cycle signal and said second output signal to return said code words to said second means identifying the assignment of previous connections that are still active and connected and to update said code words stored in said second means for said new assignments.

12. A communication system according to claim 2, wherein said eighth means includes a comparator arrangement coupled to said fifth means and said sixth means responsive to said transmitted code words and said first receive timing signal to produce an output signal indicating that said transmitted code words equal said first receive timing signals, and an updating logic circuit coupled to said sixth means, said seventh means and said comparator arrangement responsive to said second receive timing signal, said third receive timing signal, said output signal and said code words stored in said seventh means to return said code words to said seventh means identifying the assignment of previous connections that are still active and connected and to update said code words stored in said seventh means for said new assignments.

13. A communication system according to claim 12, further including a code checker to check said transmitted code words for accuracy and to produce a valid signal when said transmitted code words are accurate; and wherein said second updating logic circuit is coupled to said coder checker for response to said valid signal.

14. In a TASI communication system having P input pulse code modulated speech channels to a transmitter of said system and T pulse code modulated channels for T of said P channels propagated from said transmitter, where P is an integer greater than one and T is an integer greater than one but less than P, said P input channels being organized to form a first time division multiplex frame format, said T channels and a portion of a control word being organized to form a second time division multiplex frame format and 2(T + 1) of said second format being organized to form a multiframe, an assignment control arrangement for said transmitter comprising:

first means to produce timing signals including at least a first timing signal identifying the number of said P channels in sequence in said first format, a second timing signal identifying the number of said T channels in sequence in said second format, a third timing signal identifying the number of said T channels in sequence during each search cycle and a fourth timing signal identifying the number of said T channels in sequence during each update cycle at said transmitter;

second means to store in sequence code words identifying the previous assignment of each of said P channels;

third means coupled to said first and second means responsive to said first, second, third and fourth timing signals and said code words at the output of said second means to determine the connection and activity status of each of said P channels and to produce code words identifying the assignment of previously connected ones of active ones of said P channels to particular ones of said T channels that are still connected and active and to identify new assignments to enable newly active ones of said P channels to be connected to available ones of said T channels; and fourth means coupled to said third means, said first means and said second means responsive to at least said code words at the output of said second means, said first and fourth timing signal to return said code words to said second means identifying the assignment of previous connections that are still active and connected and to update said code words stored in said second means for said new assignments.

15. A communication system according to claim 14, wherein each of said second format includes one half of said control words, the first [2(T + 1)–2] of said second format in said multiframe includes a different one of said transmitted code words for each of the first T of said control words, and the last two of said second format in said multiframe includes a sync code word as the last of said control words.

16. A communication system according to claim 15, wherein said third means includes a T channel connection detector coupled to said first means and said second means responsive to said third transmit timing signal and said code words at the output of said second means to produce one of a T channel connected signal and a T channel not connected signal, a search and update cycle generator coupled to said first means responsive to said second transmit timing signal and said fourth transmit timing signal to produce a search cycle and an update cycle signal, a T channel status detector coupled to said connection detector and said generator responsive to said T channel connected signal and said search cycle signal to produce one of an active and connected signal, a not active and connected signal and a blank signal, a latch connected to said fourth means and said generator responsive to a predetermined signal from said fourth means and said search cycle signal to produce a first predetermined output signal, a first logic circuit coupled to said connection detector, said latch and said status detector responsive to said blank signal, said first predetermined output signal and said channel not connected signal to produce a second predetermined output signal, a second logic circuit coupled to said status detector and said generator responsive to said not active and connected signal and said search cycle signal to produce a third predetermined output signal, a first register coupled to said first means, said status detector and said generator responsive to said first transmit timing signal, said active connected signal and said update cycle signal to load said first transmit timing signal into said first register during a first condition of said active signal and said update cycle signal and to load a code representing an inactive channel in said first register during a second condition of said active connected signal and said update cycle signal, a second register coupled to said first means and said first logic circuit responsive to said first transmit timing signal and said second predetermined output signal to load said first transmit timing signal into said second register upon said second predetermined output signal achieving a given condition, and a multiplexer coupled to said first and second registers and said second logic circuit to provide said code words equal to the contents of said first register during a first condition of said third predetermined output signal and equal to the contents of said second register during a second condition of said third predetermined output signal.

17. A communication system according to claim 16, further including an activity simulator providing an active signal, and wherein said status detector is coupled to said activity simulator for response to said active signal.

18. A communication system according to claim 17, wherein said fourth means includes a comparator coupled to said multiplexer and said first means responsive to said code words and said first transmit timing signal to produce a first output signal identifying said code words as being blank code words and a second output signal indicating that said code words equal said first transmit timing signals, one of said first and second output signals being connected to said latch, and an updating logic circuit coupled to said first means, said generator, said second means and said comparator responsive to said fourth transmit timing signal, said update cycle signal, said code words stored in said second means and said second output signal to return said code words to said second means identifying the assignment of previous connections that are still active and connected and to update said code words stored in said second means for said new assignments.

19. A communication system according to claim 16, wherein said fourth means includes a comparator coupled to said multiplexer and said first means responsive to said code words and said first transmit timing signal to produce a first output signal identifying said code words as being blank code words and a second output signal indicating that said code words equal said first transmit timing signals, one of said first and second output signals being connected to said latch, and an updating logic circuit coupled to said first means, said third means, said comparator and said second means responsive to said fourth transmit timing signal, an update cycle signal, said second output signal and said code words stored in said second means to return said code words to said second means identifying the assignment of previous connections that are still active and connected and to update said code words stored in said second means for said new assignments.

20. A communication system according to claim 15, wherein said fourth means includes a comparator coupled to said third means and said first means responsive to said code words and said first transmit timing signal to produce a first output signal, identifying said code words as being blank code words and a second output signal indicating that said code words equal said first transmit timing signals, and an updating logic circuit coupled to said first means, said third means and said comparator responsive to said fourth transmit timing signal, an update cycle signal and said second output signal to return said code words to said second means identifying the assignment of previous connections that are still active and connected and to update said code words stored in said second means for said new assignments.

21. In a TASI communication system having P output pulse code modulated speech channels from a receiver of said system and T pulse code modulated channels for T of said P channels propagated to said receiver, where P is an integer greater than one and T is an integer greater than one but less than P, said P output channels being organized to form a first time division multiplex frame format, said T channels and one-half of a control word being organized to form a second time division multiplex frame format, 2(T + 1) of said second format being organized to form a multiframe, and the first [2(T + 1)–2] of said second format in said multiframe including a different one of an assignment code word for each of the first T of said control words, an assignment control arrangement for said receiver comprising:

first means to produce timing signals including a first timing signal identifying the number of said P channels in sequence in said first format, a second timing signal identifying the number of said T channels in sequence in said second format, and a third timing signal identifying the number of said T channels in sequence during each update cycle at said receiver;

second means to store in sequence code words identifying the previous assignemnt of each of said T channels; and third means coupled to said first means and said second means responsive to said received assignment code words, said first, second and third timing signals and said code words at the output of said second means to return said code words to said second means identifying the assignment of previous connections that are still active and connected and to update said code words stored in said second means for said new assignments.

22. A communication system according to claim 21, wherein said third means includes a comparator coupled to said first means responsive to said received assignment code words and said first timing signal to produce an output signal indicating that said received assignment code words equal said first receive timing signals, and an updating logic circuit coupled to said first means, said second means and said comparator responsive to said second timing signal, said third timing signal, said output signal and said code words stored in said second means to return said code words to said second means identifying the assignment of previous connections that are still active and connected and to update said code words stored in said second means for said new assignments.

23. A communication system according to claim 22, further including a code checker to check said received assignment code words for accuracy and to produce a valid signal when said received assignment code words are accurate; and wherein said updating logic circuit is coupled to said code checker for response to said valid signal.

* * * * *